US012684519B2

(12) United States Patent
Balmakhtar et al.

(10) Patent No.: US 12,684,519 B2
(45) Date of Patent: Jul. 14, 2026

(54) END-TO-END (E2E) SECURE EDGE APPLICATION SERVICE

(71) Applicant: T-Mobile Innovations LLC, Overland Park, KS (US)

(72) Inventors: Marouane Balmakhtar, Fairfax, VA (US); Serge Manning, Plano, TX (US)

(73) Assignee: T-Mobile Innovations LLC, Overland Park, KS (US)

( * ) Notice: Subject to any disclaimer, the term of this patent is extended or adjusted under 35 U.S.C. 154(b) by 308 days.

(21) Appl. No.: 18/497,834

(22) Filed: Oct. 30, 2023

(65) Prior Publication Data

US 2025/0142507 A1     May 1, 2025

(51) Int. Cl.
| | |
|---|---|
| *H04W 4/00* | (2018.01) |
| *H04W 48/16* | (2009.01) |
| *H04W 60/04* | (2009.01) |
| *H04W 76/10* | (2018.01) |
| *H04L 61/4511* | (2022.01) |

(52) U.S. Cl.
CPC ........... *H04W 60/04* (2013.01); *H04W 48/16* (2013.01); *H04W 76/10* (2018.02); *H04L 61/4511* (2022.05)

(58) Field of Classification Search
None
See application file for complete search history.

(56) References Cited

U.S. PATENT DOCUMENTS

| | | | | |
|---|---|---|---|---|
| 11,729,137 B2 * | 8/2023 | Lee | ...................... | H04L 61/4541 |
| | | | | 709/245 |
| 2020/0404069 A1 * | 12/2020 | Li | ............................ | H04L 67/59 |
| 2022/0150696 A1 * | 5/2022 | Rajadurai | ........... | H04W 12/041 |
| 2022/0200948 A1 * | 6/2022 | Gundavelli | ........... | H04W 24/04 |
| 2022/0263788 A1 * | 8/2022 | Lee | ...................... | H04L 61/4511 |
| 2022/0321475 A1 * | 10/2022 | Thiebaut | ................. | H04L 47/11 |
| 2023/0268982 A1 * | 8/2023 | Li | ...................... | H04B 7/15507 |
| | | | | 370/315 |
| 2023/0298471 A1 * | 9/2023 | Viswanathan | ........... | G08G 5/30 |
| | | | | 701/3 |
| 2023/0368077 A1 * | 11/2023 | Yao | ........................ | G06N 20/00 |
| 2023/0370879 A1 * | 11/2023 | Chou | .................... | H04W 24/08 |
| 2024/0015569 A1 * | 1/2024 | Doostnejad | ............. | H04L 47/24 |
| 2024/0314058 A1 * | 9/2024 | Mueck | .................... | H04L 41/40 |
| 2024/0414119 A1 * | 12/2024 | Shen | .................... | H04L 61/4511 |
| 2024/0414212 A1 * | 12/2024 | Muñoz De La Torre Alonso | ....... | |
| | | | | H04L 65/1045 |
| 2025/0030774 A1 * | 1/2025 | Tonesi | .................... | H04L 67/51 |

(Continued)

*Primary Examiner* — Bob A Phunkulh

(57) ABSTRACT

A method to trigger, by a RAN, a secure edge (SE) connection service over the RAN between a known user equipment (UE) and an SE application server is disclosed. The method comprises the RAN enabling an SE connection service. Responsive to the UE's registration request, the RAN registers the UE and loads associated user subscription data into a session manager (SM). Based on this data, an SE connection is configured within the RAN, and the SM establishes a PDU session between the UE and the SM by establishing a secure path between the UE and the SE application server over the configured SE connection between the UE and the RAN. The SM informs the UE of a resolver. After PDU session establishment, the resolver receives a resolution request from the UE and responds by sending an IP address directing the UE over the secure path to the SE application server.

18 Claims, 14 Drawing Sheets

(56) References Cited

U.S. PATENT DOCUMENTS

2025/0113243 A1 *  4/2025  Kim .................. H04W 28/0284
2025/0203561 A1 *  6/2025  Thiebaut ............... H04W 12/63
2025/0287294 A1 *  9/2025  Xu .......................... H04W 8/20

* cited by examiner

Figure 6:
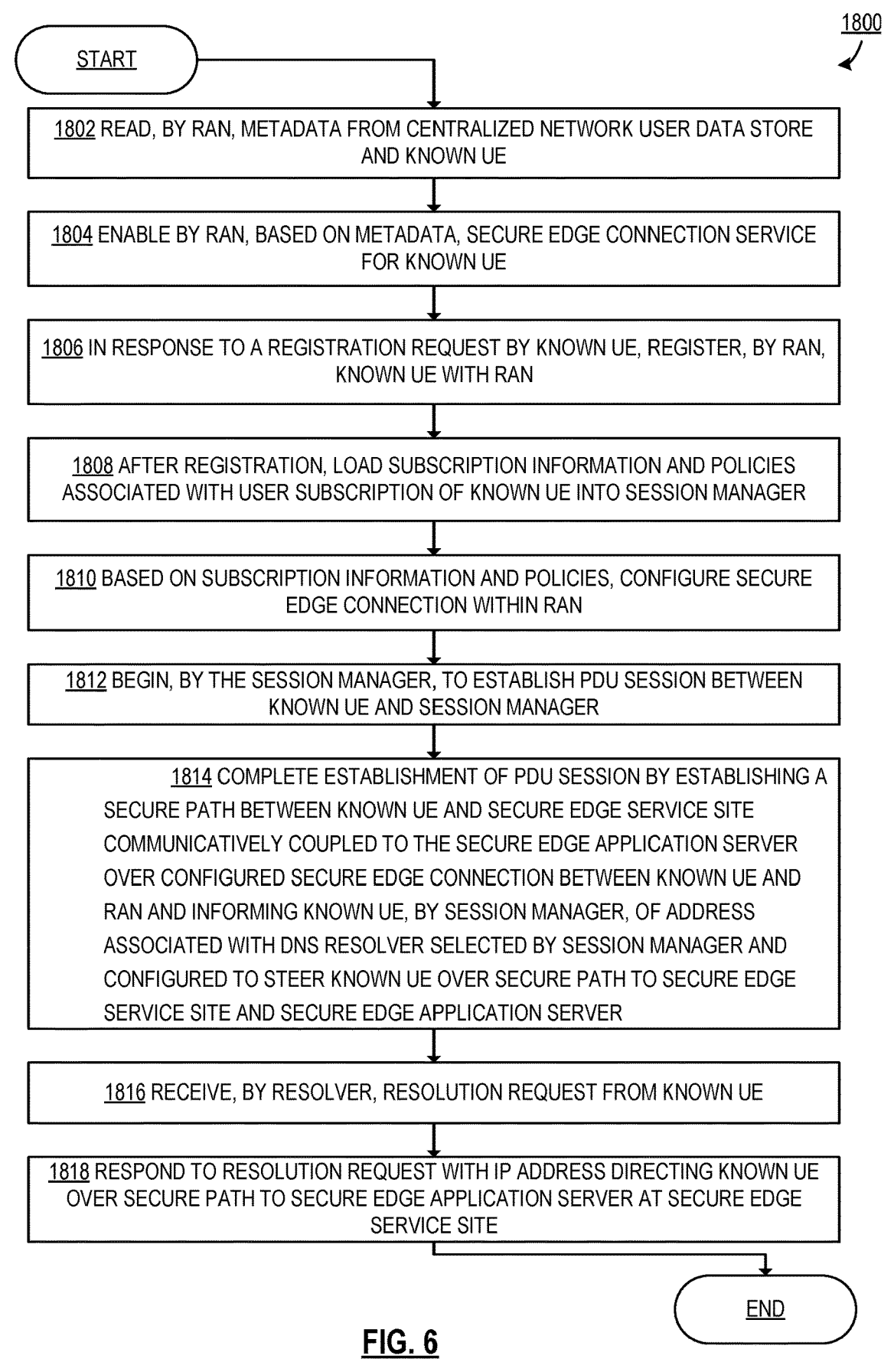

1800

START

1802 READ, BY RAN, METADATA FROM CENTRALIZED NETWORK USER DATA STORE AND KNOWN UE

1804 ENABLE BY RAN, BASED ON METADATA, SECURE EDGE CONNECTION SERVICE FOR KNOWN UE

1806 IN RESPONSE TO A REGISTRATION REQUEST BY KNOWN UE, REGISTER, BY RAN, KNOWN UE WITH RAN

1808 AFTER REGISTRATION, LOAD SUBSCRIPTION INFORMATION AND POLICIES ASSOCIATED WITH USER SUBSCRIPTION OF KNOWN UE INTO SESSION MANAGER

1810 BASED ON SUBSCRIPTION INFORMATION AND POLICIES, CONFIGURE SECURE EDGE CONNECTION WITHIN RAN

1812 BEGIN, BY THE SESSION MANAGER, TO ESTABLISH PDU SESSION BETWEEN KNOWN UE AND SESSION MANAGER

1814 COMPLETE ESTABLISHMENT OF PDU SESSION BY ESTABLISHING A SECURE PATH BETWEEN KNOWN UE AND SECURE EDGE SERVICE SITE COMMUNICATIVELY COUPLED TO THE SECURE EDGE APPLICATION SERVER OVER CONFIGURED SECURE EDGE CONNECTION BETWEEN KNOWN UE AND RAN AND INFORMING KNOWN UE, BY SESSION MANAGER, OF ADDRESS ASSOCIATED WITH DNS RESOLVER SELECTED BY SESSION MANAGER AND CONFIGURED TO STEER KNOWN UE OVER SECURE PATH TO SECURE EDGE SERVICE SITE AND SECURE EDGE APPLICATION SERVER

1816 RECEIVE, BY RESOLVER, RESOLUTION REQUEST FROM KNOWN UE

1818 RESPOND TO RESOLUTION REQUEST WITH IP ADDRESS DIRECTING KNOWN UE OVER SECURE PATH TO SECURE EDGE APPLICATION SERVER AT SECURE EDGE SERVICE SITE

END

Figure 7:
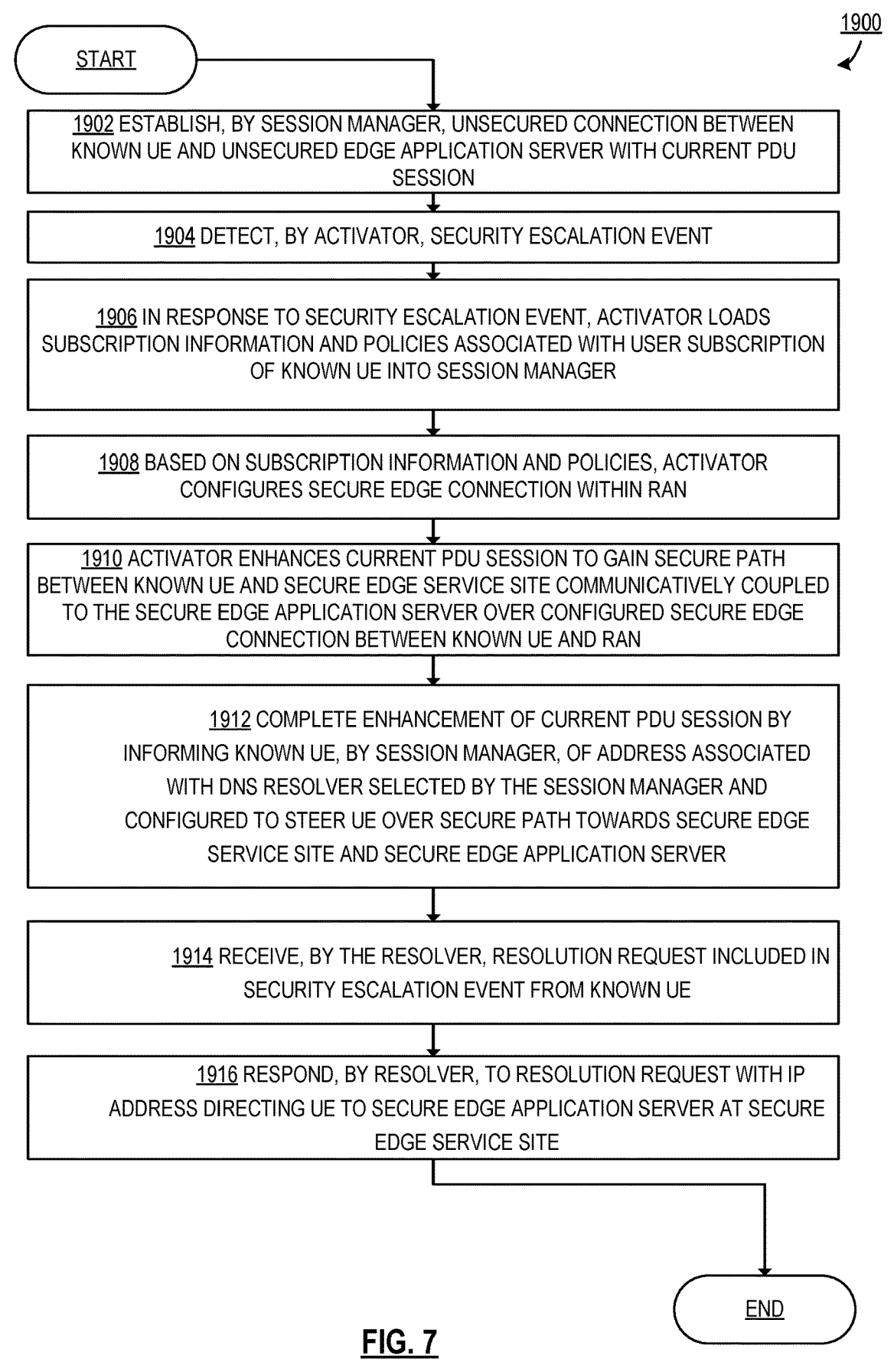

START

1902 ESTABLISH, BY SESSION MANAGER, UNSECURED CONNECTION BETWEEN KNOWN UE AND UNSECURED EDGE APPLICATION SERVER WITH CURRENT PDU SESSION

1904 DETECT, BY ACTIVATOR, SECURITY ESCALATION EVENT

1906 IN RESPONSE TO SECURITY ESCALATION EVENT, ACTIVATOR LOADS SUBSCRIPTION INFORMATION AND POLICIES ASSOCIATED WITH USER SUBSCRIPTION OF KNOWN UE INTO SESSION MANAGER

1908 BASED ON SUBSCRIPTION INFORMATION AND POLICIES, ACTIVATOR CONFIGURES SECURE EDGE CONNECTION WITHIN RAN

1910 ACTIVATOR ENHANCES CURRENT PDU SESSION TO GAIN SECURE PATH BETWEEN KNOWN UE AND SECURE EDGE SERVICE SITE COMMUNICATIVELY COUPLED TO THE SECURE EDGE APPLICATION SERVER OVER CONFIGURED SECURE EDGE CONNECTION BETWEEN KNOWN UE AND RAN

1912 COMPLETE ENHANCEMENT OF CURRENT PDU SESSION BY INFORMING KNOWN UE, BY SESSION MANAGER, OF ADDRESS ASSOCIATED WITH DNS RESOLVER SELECTED BY THE SESSION MANAGER AND CONFIGURED TO STEER UE OVER SECURE PATH TOWARDS SECURE EDGE SERVICE SITE AND SECURE EDGE APPLICATION SERVER

1914 RECEIVE, BY THE RESOLVER, RESOLUTION REQUEST INCLUDED IN SECURITY ESCALATION EVENT FROM KNOWN UE

1916 RESPOND, BY RESOLVER, TO RESOLUTION REQUEST WITH IP ADDRESS DIRECTING UE TO SECURE EDGE APPLICATION SERVER AT SECURE EDGE SERVICE SITE

END

App 1   App 2   App 3

Browser   Phone   Camera

400

_602_

_620_

END-TO-END (E2E) SECURE EDGE APPLICATION SERVICE

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

The $3^{rd}$ Generation Partnership Project (3GPP) encompasses numerous standards organizations that develop protocols for mobile telecommunications. 3GPP has developed and maintained standards concerning: GSM and related 2G and 2.5G standards; UTMS and related 3G standards; LTE and related 4G standards; 5G NR and related 5G standards; and the access-independent IP Multimedia System (IMS). Several of these standards currently include edge compute protocols, entities, and procedures that allow user equipment (UE) and telecommunication networks to discover and select edge resources such as edge data networks (edge DNs); edge domain name service (DNS) resolvers and DNS servers; and edge application servers (EASes) located within an edge DN. Traffic from a UE, including application traffic, intended for an EAS is a subset of general network traffic that is routed through an edge DN towards an EAS, instead of the default non-edge DN. Existing contemporary 3GPP edge discovery and selection standards fail to provide a heightened level of security when requested by an edge application.

SUMMARY

In an embodiment, a method to trigger, by a radio access network (RAN), a secure edge connection service over the RAN between a known user equipment (UE) associated with a user subscription and a secure edge application server is disclosed. The method comprises reading, by the RAN, metadata from a centralized network user data store and the known UE; enabling, by the RAN, based on the metadata, the secure edge connection service for the known UE; in response to a registration request by the known UE, registering, by the RAN, the known UE with the RAN; and after registration, loading subscription information and policies associated with the user subscription of the known UE into a session manager. The method further comprises: based on the subscription information and policies, configuring a secure edge connection within the RAN; beginning to establish a packet data unit (PDU) session between the known UE and the session manager; and completing the establishment of the PDU session by at least establishing, by the session manager, a secure path between the known UE and a secure edge service site over the configured secure edge connection between the known UE and the RAN, the secure edge service site being communicatively coupled to the secure edge application server, and informing the known UE, by the session manager, of an address associated with a domain name service (DNS) resolver selected by the session manager, the selected resolver configured to steer the known UE over the secure path to the secure edge service site and the secure edge application server. After completing the establishment of the PDU session, the method further comprises receiving, by the resolver, a resolution request from the known UE and responding to the resolution request by sending an IP address that directs the known UE over the secure path to the secure edge application server at the secure edge service site.

In another embodiment, a method to dynamically trigger, by an activator, a secure edge connection over a radio access network (RAN) between a known user equipment (UE) associated with a user subscription and a secure edge application server is disclosed. The method comprises establishing, by a session manager, an unsecured connection between the known UE and an unsecured edge application server, the unsecured session having a current packet data unit (PDU) session; and detecting, by the activator, a security escalation event. In response to detecting the security escalation event, the activator performing operations comprising: loading subscription information and policies associated with the user subscription of the known UE into the session manager; based on the subscription information and policies, configuring a secure edge connection within the RAN; and enhancing the current PDU session. The enhancement comprises the current PDU session gaining a secure path between the known UE and a secure edge service site over the configured secure edge connection between the known UE and the RAN. In this embodiment, the secure edge service site is communicatively coupled to the secure edge application server. The method further comprises completing the enhancement of the current PDU session. The enhancement is completed by at least: the session manager informing the known UE of an address associated with a domain name service (DNS) resolver selected by the session manager, where the selected resolver is configured to steer the UE over the secure path towards the secure edge service site and the secure edge application server; the resolver receiving a resolution request from the known UE, where the resolution request is included in the security escalation event; and the resolver responding to the resolution request by sending an IP address that directs the UE to the secure edge application server at the secure edge service site.

In yet another embodiment, a known user equipment (UE) is described. The known UE comprises a non-transitory memory; an antenna; and a radio transceiver coupled to the antenna. The radio transceiver is communicatively coupled to a radio access network (RAN). The known UE further comprises a registration module communicatively coupled to the radio transceiver; a secure tunnel module (STM) communicatively coupled to the radio transceiver; a processor coupled to the non-transitory memory, the STM, the registration module, and the radio transceiver; and a secure connection trigger module stored in the non-transitory memory. When the secure connection trigger module is executed by the processor, the secure connection trigger module performs operations comprising sending, using the registration module, a request to register the known UE over the RAN to a session manager, the request comprising the known UE transmitting over the RAN a request metadata, and the registering comprising beginning to establish a packet data unit (PDU) session between the known UE and the session manager.

The operations further comprise triggering, using the STM, a request for a secure edge connection over the RAN to a secure edge application server; and based on the triggered request, receiving, from the session manager, over the RAN, a secure path between the known UE and a secure edge service site over a configured secure edge connection between the known UE and the RAN. The secure edge service site is communicatively coupled to the secure edge application server. The operations further comprise completing the establishment of the PDU session using at least the STM, wherein the PDU session comprises the secure edge connection from the UE to the secure edge service site over the secure path; receiving, from the session manager, an address associated with a domain name service (DNS) resolver selected by the session manager, where the selected resolver is configured to steer the known UE over the secure path towards the secure edge service site and the secure edge application server; sending, to the resolver, a resolution request from the known UE; and receiving, from the resolver, a response to the resolution request, the response comprising an IP address that directs the known UE over the secure path to the secure edge application server at the secure edge service site.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

FIG. 6 is a flow chart of a method according to an embodiment of the disclosure.

FIG. 7 is a flow chart of another method according to an embodiment of the disclosure.

DETAILED DESCRIPTION

Figure 1:
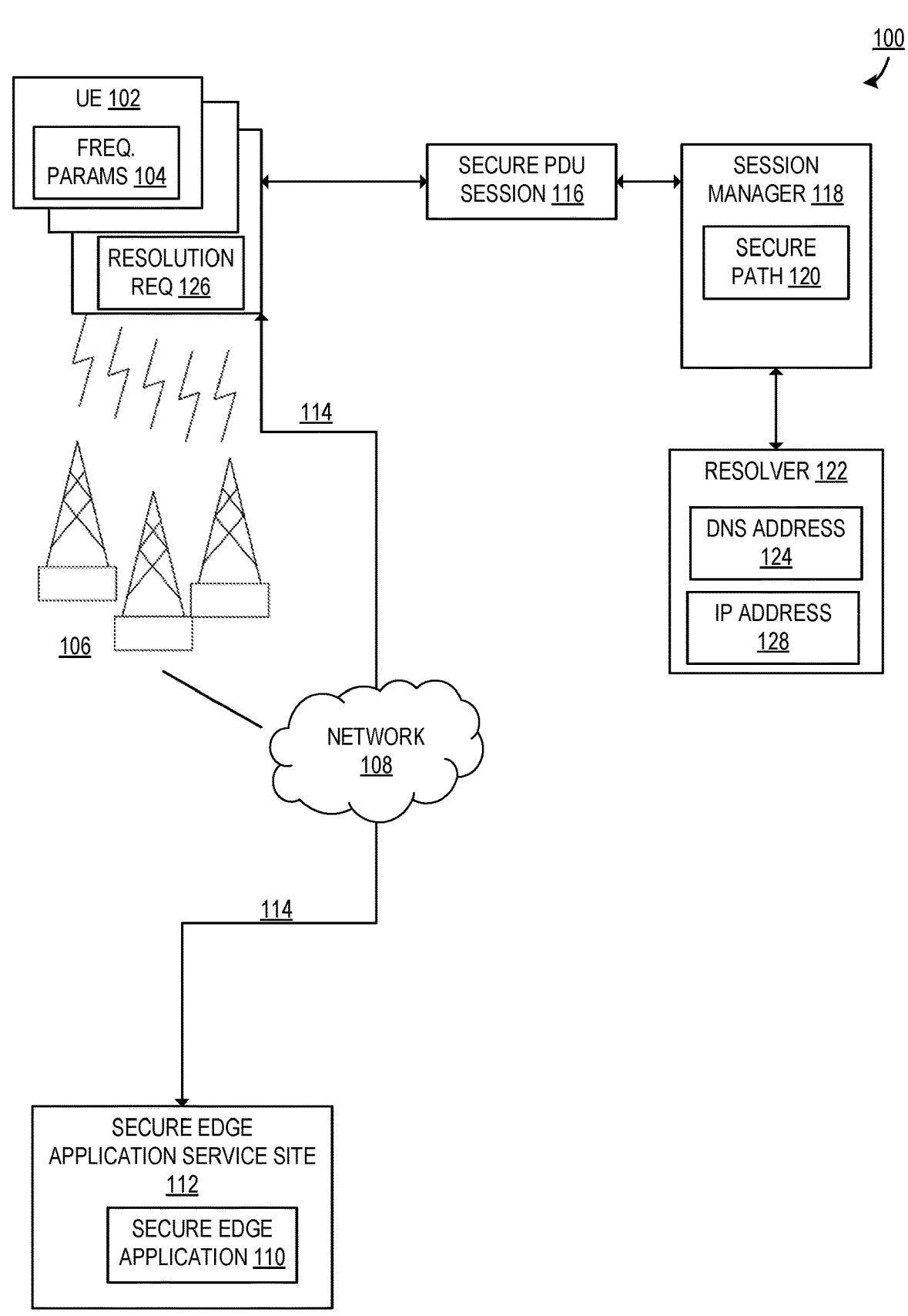
FIG. 1 is a block diagram of a system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The disclosed embodiments operate in an unconventional manner by extending the current 3GPP edge compute standards suite to provide at least three modes of an end-to-end (E2E) secure edge application service (a "secure EAS") that are interoperable with a UE and are not present in the current 3GPP standards. These secure EASes include but are not limited to secure access service edges (SASE) and other security infrastructures having similar security features. Secure EASes deliver features including but not limited to wide area network (WAN) access and security controls as a cloud computing service directly to a connection source (e.g., a user device/user equipment (UE), an internet of things (IoT) device, or an edge computing location housing a secure edge application server). In some embodiments, the WAN access or security controls are delivered to a connection source via a radio access network (RAN).

This is in contrast to the traditional, contemporary approach of housing a secure application service in a centralized data center. As discussed throughout this disclosure, a number of 3GPP edge discovery and selection standards fail to provide a heightened level of security when requested by an otherwise unsecure EAS housed at a centralized data center. Such centralized data centers do not utilize cloud computing or edge computing technologies. Additionally, housing any EAS at a centralized data center increases the risk of introducing latency that detrimentally impacts the performance of the EAS, as the centralized data center is a fixed topographical point, and many UEs discussed herein are not. Thus, the likelihood of a UE moving a sufficient distance to create detrimental experienced latency when in communication with an EAS located at a centralized data center is quite high. Such experienced latency results from transmitting network traffic over long distances to a limited number of data centers—or in some cases, only a single data center. In some scenarios, the experienced latency rises to such a level that the ability of a user of a UE to achieve productive use the EAS is degraded or even rendered impracticable.

Additionally, centralized EASes and UEs relying on access thereto to function are vulnerable to hostile actions targeting or accidents impacting the function or availability of such centralized EASes. In this way, centralized EASes share the same security and availability vulnerabilities, as well as a lack of built-in redundancies and other guards against a central point of failure, common to any centralized telecommunications service.

Further, some of the traditional, contemporary centralized EAS implementations provided by, e.g., the 3GPP standards, rely on a centralized, unsecure gateway or authentication system to gain access to the centralized EAS. Thus, a UE attempting to gain access to such traditional, contemporary centralized EAS implementations just to authenticate and gain access to the centralized EAS, let alone actually interact with the centralized EAS, separately faces the same or similar performance, availability, and security issues as discussed above in the context of centralized EAS usage also in the context of EAS access and authentication. Points of failure, performance degradation, and security vulnerabilities endemic to centralized infrastructures are thus doubled, existing at the access/authentication stage and also at the usage/interaction stage.

Edge computing is an important aspect of the current 5G wireless communications protocols, including those promulgated as part of the 3GPP standards. As discussed above, traditional, contemporary 5G edge computing implementations, unlike the present disclosure, have failed to prioritize providing a secure edge communication service implementation.

Some embodiments of the secure EAS disclosed herein use cloud and edge computing technologies to reduce the latency and other detrimental and negative performance characteristics and risks discussed above experienced at the UE in comparison to this traditional, contemporary approach. By contrast, the disclosed embodiments in particular reduce latency in modern computing environments. Modern computing environments feature increased dispersal away from centralized locations of both users and the application servers that users rely on to maintain productivity.

In a first, UE-triggered mode, a UE indicates to a data network that the UE is capable of at least one secure edge compute operation. This indication includes notifying the data network that a particular edge application to be run involves at least one of sensitive operations or sensitive data that justify a heightened level of security. This determination is based on factors including but not limited to the UE's current geographical or network topographical location or application-dependent parameters. Depending on the embodiment, this location is classified as, e.g., (1) a public space versus a private space (e.g., a corporate campus, an educational campus, a residence, an office, etc.), or (2) a roaming data network or foreign location versus a home country and home data network. Other embodiments use any determination process that is operable to determine when an edge application is to be run that justifies a heightened level of security. In some embodiments, application-dependent parameters include but are not limited to exchanging sensitive data sets and other operations associated with a specific edge application. In this mode, a request for a secure EAS is instantiated on a UE (e.g., by at least one of an application or service running on the UE), and the UE proceeds to ask the RAN for a session having heightened security. In some embodiments utilizing the 3GPP's 5G networking standards, this session is a packet data unit (PDU) session providing end-to-end connectivity between the UE and a specific data network over the RAN.

A second, network-triggered mode operates similarly to the UE-triggered mode, except as discussed below. In the network-triggered mode, the network (e.g., the RAN or an edge data network communicatively coupled to the RAN) determines that a particular secure edge application to be run involves at least one of sensitive operations or sensitive data justifying a heightened level of security. This determination is based on factors including but not limited to the UE's current geographical or network topographical location or application-dependent parameters. Depending on the embodiment, this location is classified as, e.g., (1) a public space versus a private space (corporate campus, educational campus, residence, office, etc.), or (2) a roaming data network or foreign location versus a home country and home data network. Other embodiments use any determination process that is operable to determine when an edge application is to be run that justifies a heightened level of security. In some embodiments, application-dependent parameters include but are not limited to exchanging sensitive data sets and other operations associated with a specific edge application.

Additionally, in some embodiments, the network determines that a heightened level of security is justified because at least one of the network or the secure edge application is presently experiencing security attacks. In response to such attack conditions, new edge connections are given elevated security. In this mode, a request for a secure EAS arises within the network, and the network works with the UE to create a session having heightened security. In some embodiments utilizing the 3GPP's 5G networking standards, this session is a PDU providing end-to-end connectivity between the UE and a specific data network over the RAN. In some embodiments utilizing this mode, the UE lacks sufficient hardware capabilities to establish a secure connection to a secure EAS, so the network establishes a secure edge connection via a PDU session for the benefit of the UE, allowing the UE to operate with a heightened level of security even if the UE lacks even the capability to detect that a secure edge connection is in place.

In some embodiments of the above modes, a network or application provider protects secure application traffic by at least one of: establishing an isolated (that is, separate and dedicated) PDU session, using an isolated network slice, or connecting to a separate and dedicated edge data network that carries all the application traffic. This isolates the data exchange associated with the secure application from the data exchange of other applications.

In some other embodiments of the above modes, the network or application provider protects secure application traffic by at least one of: enabling over the air traffic protection schemes or establishing a secure tunnel starting in the network (e.g., the RAN) and connecting to the edge data network. Such embodiments are operable even when there is no secure tunnel capability in the UE (e.g., due to hardware limitations).

In yet other embodiments, at least one of a network such as the RAN or an edge application provider protects secure application traffic through the use of secure DNS message exchanges and secure DNS procedures instead of normal or public DNS. In some embodiments, equivalents of secure DNS message exchanges and secure DNS procedures defined by various 3GPP standards are used instead of DNS. In some other embodiments, equivalents of secure DNS message exchanges and secure DNS procedures defined by various Internet Engineering Task Force (IETF) standards are used instead of DNS, including but not limited to "DNS Queries over HTTPS (DoH)," published in the IETF Request for Comments (RFC) 8484 ("IETF RFC 8484" or "RFC 8484" herein).

Turning now to FIG. 1, a system 100 is described. In an embodiment, the system 100 comprises a plurality of mobile communication devices (also referred to herein as user equipment or UE) 102, a plurality of cell sites 106, and a network 108. In some embodiments, the network 108 comprises a radio access network (RAN). A UE 102 may be a cell phone, a mobile phone, a smart phone, a personal digital assistant (PDA), an Internet of things (IoT) device, a wearable computer, a headset computer, a laptop computer, a tablet computer, or a notebook computer. The network 108 may be one or more private networks, one or more public networks, or a combination thereof. The cell sites 106 provide wireless communication links to the UE 102 according to a 5G, a long-term evolution (LTE), a code division multiple access (CDMA), or a global system for mobile communications (GSM) wireless telecommunication protocol. Some of the UEs 102 may be able to support two or more different wireless telecommunication protocols and accordingly may be referred to in some contexts as multi-protocol devices. In an embodiment, one or more of the UEs 102 may carry on wireless communication based on frequency parameters 104 and/or wireless telecommunication protocol selection parameters stored in a non-transitory memory of the UE 102. In an embodiment, the frequency parameters 104 may be reprogrammed over-the-air, for example via a configuration command received by a UE 102 from a cell site 106. In another embodiment, the frequency parameters 104 may be reprogrammed via a wired communication link, for example via a docking station or via a recharging plug.

The UEs 102 may communicate with a secure edge application 110 hosted at a secure edge application service site 112 via the wireless links provided by the cell sites 106 and via wired links provided by the network 108. In an embodiment, the secure edge application 110 may be any application run at least partially locally or at least partially remotely on the UE 102 that uses a secure edge connection 114 to provide E2E encryption between the UE 102 and the secure edge application 110. The UE 102 may communicate with a secure edge application 110 hosted at a secure edge application service site 112 by establishing a secure packet data unit (PDU) session 116 between the UE 102 and a session manager 118. The secure PDU session 116 includes a secure path 120 between the known UE 102 and the secure edge service site 112 housing the secure edge application server 110.

To facilitate communications between the UE 102 and the secure edge application server 110, the session manager 118 informs the UE 102 of an address 124 associated with a domain name service (DNS) resolver 122. The resolver 122 is selected by the session manager 118 and configured to steer the UE 102 over the secure path 120 to the secure edge service site 112 and the secure edge application server 110. Upon receipt by the resolver 122 of a resolution request 126 from the UE 102, the resolver 122 responds with an IP address 128 directing the UE 102 over the secure path 120 to the secure edge application server 110 at the secure edge service site 112.

The UEs 102 are associated with subscriptions to the network 108 belonging to users who may rely on the UEs 102 to carry out both personal tasks and professional duties over an E2E secure edge application service. Such tasks and duties involve, for example, sensitive data, and include but are not limited to banking activities, activities relating to medical records, activities relating to confidential work data, etc. Additionally, in situations where unsecured communications are subject to interception by hostile actors, the E2E secure edge application service at least enhances the safety of the user and their sensitive data. Implementations of the system 100, as well as associated methods, are described in further detail in the below disclosure.

Figure 2:
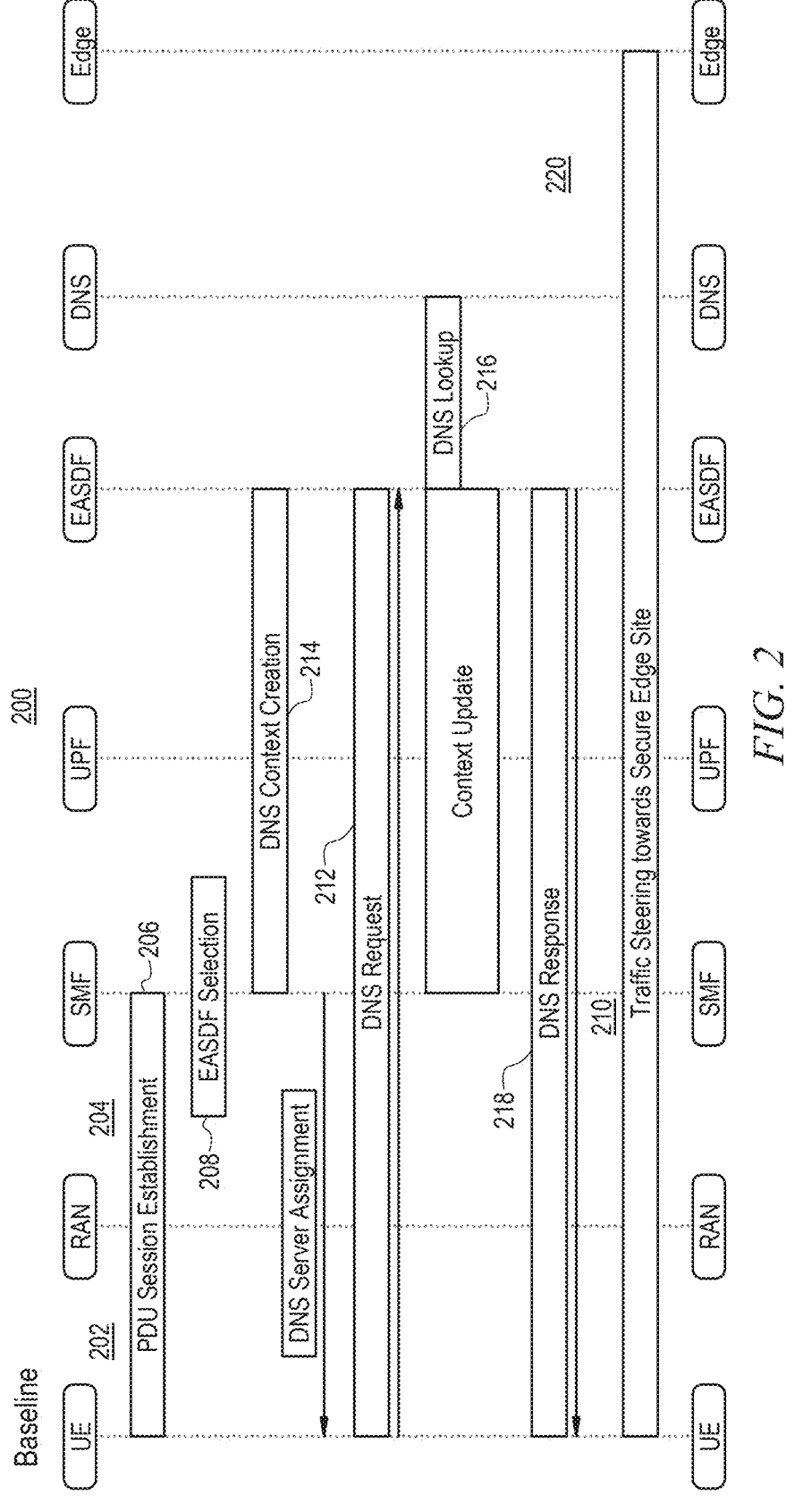
FIG. 2 is a flow diagram of a 3GPP standards-compliant unsecured edge application service process flow.

Turning now to FIG. 2, a flow diagram of a 3GPP standards-compliant unsecured edge application service 200 is described. Some embodiments of the end-to-end secure application service described herein are implemented as an extension of the 3GPP standards-compliant unsecured edge application service process flow 200 (also called "process flow 200" herein). Except as otherwise defined in this disclosure, acronyms and other terms used to describe the process flow 200 have at least the meanings provided by applicable 3GPP standards (e.g., the 3GPP 5G standard).

At operation 202, a UE registers with a network. At operation 204, UE subscription information and policies from a UDM and a PCF are loaded into an AMF and an SMF. At operation 206, a PDU session establishment procedure starts between the UE and the SMF. At operation 208, the SMF selects an edge application server discovery function (EASDF) and provides domain name service (DNS)-related information to the selected EASDF. At operation 210, using a protocol configuration option set (PCO) option associated with the PDU session establishment, the SMF informs the UE that a DNS server address is the address of the EASDF. This completes establishment of the PDU session. Via the PDU session, the UE now has access to a packet data session.

At operation 212, the UE sends a DNS request to the EASDF. In some embodiments, based on DNS handling rules, after receiving the DNS request from the UE and before sending a final DNS response back to the UE, the EASDF optionally exchanges information with the SMF. The exchanged information comprises, as a non-exclusive example, a fully qualified domain name (FQDN) associated with the DNS request. In such embodiments, the FQDN allows the SMF to update the DNS handling rules in the EASDF.

At operation 214, the EASDF processes the information that the EASDF has received via the SMF. This received information includes but is not limited to: the UE subscription information from the UDM; network policies from the PCF; DNS message handling rules generated by the SMF; and locally configured information in EASDF. In some such embodiments, the locally configured information includes, as a non-limiting example, information about EAS servers. Based on this information processing, the EASDF determines a real DNS server. In some embodiments, the EASDF modifies the DNS request of the UE and proceeds to send a new DNS request to the real DNS server based on the DNS request of the UE. In such embodiments, the EASDF then receives a real DNS server response.

At operation 216, on the information received by the EASDF, including the real DNS server response, the EASDF determines the EAS IP address. The 3GPP standards provide various implementations for this determination; specific embodiments use the implementations suited to specific use cases.

At operation 218, the EASDF creates a DNS response and communicates the DNS response back to the UE. The DNS response directs the UE to establish an edge connection to an appropriate (e.g., proximate in at least one of geography or network topography) EAS at operation 220.

Figure 3:
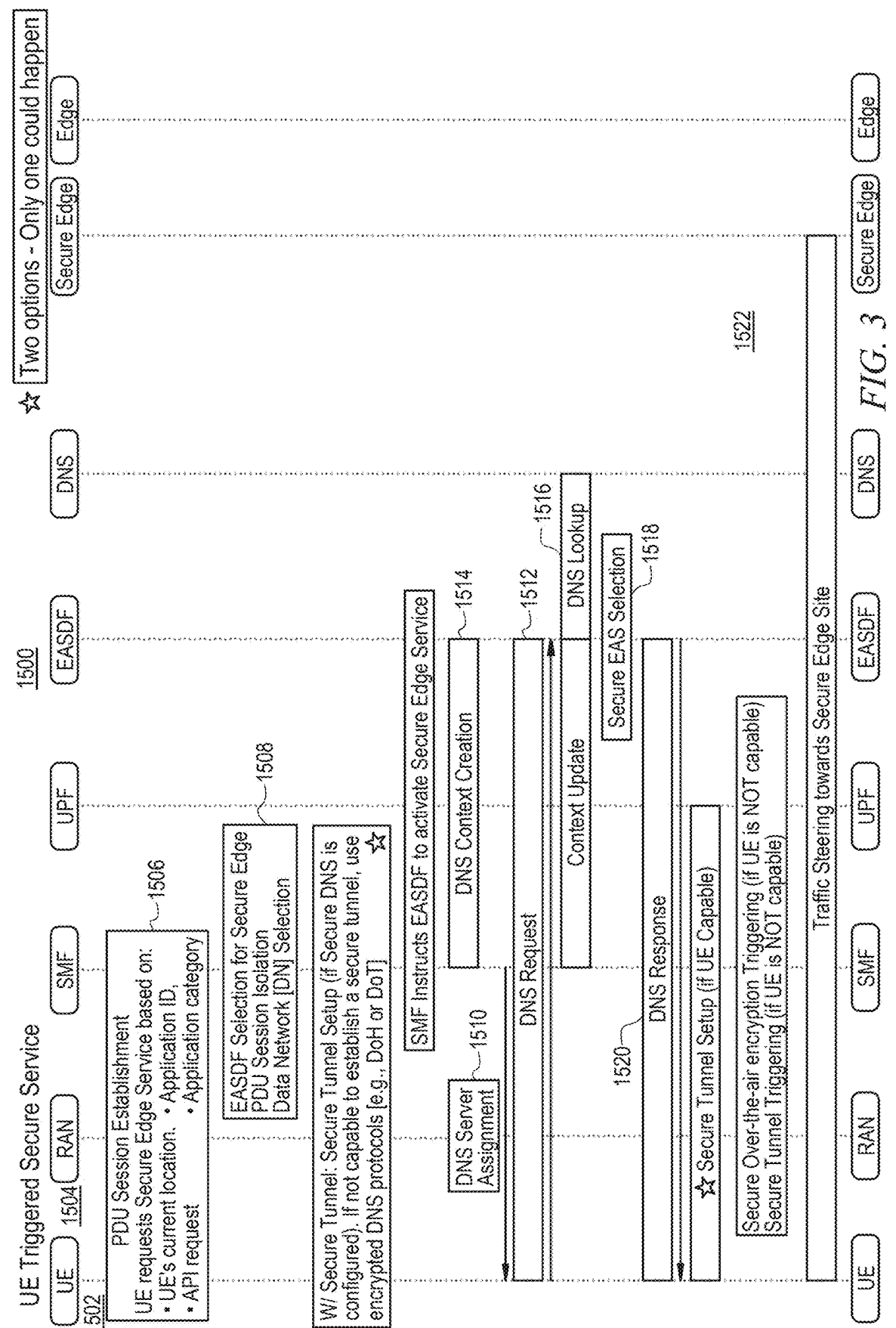
FIG. 3 is a flow diagram of a 3GPP standards-compliant edge application service enhanced to provide a UE-triggered end-to-end (E2E) secure application service.

Turning now to FIG. 3, a flow diagram of a 3GPP standards-compliant edge application service 1500 enhanced to provide a UE-triggered end-to-end (E2E) secure application service (also called process flow 1500 herein) is described. In some embodiments, the process flow 1500 extends the process flow 200. Except as otherwise defined in this disclosure, acronyms and other terms used to describe the process flow 1500 have at least the meanings provided by the applicable 3GPP standard(s) (e.g., the 3GPP 5G standard(s)).

At operation 1502, before a UE registers with a network (e.g., a RAN), the AF uses the standardized "AF influenced on Traffic Routing" (TS 23.501 5.6.7) procedures to provision information and policy rules to turn on a secure edge service for certain UEs when those certain UEs connect to edge networks. The information and policy rules that extend this standard include but are not limited to indications of when and where to turn on a secure edge service. These information and policy rules include: UE locations; application FQDNs; edge data network names (DNNs); slice IDs (S-NSSAIs); at least one flag indicating a need for an isolated PDU session; at least one flag indicating a need for secure E2E tunnels; at least one flag indicating a need for over-the-air encryption in the RAN; and at least one flag indicating a need for a secure tunnel in the network between the RAN and the UPFs. Such information and policies are stored in the UDM.

At operation 1504, the UE registers with the network. The UE subscription information and policies from the UDM and the PCF are loaded into the AMF and the SMF.

The subscription information and policies indicate at least the following:

The UE having the capability to connect to a secure edge service, as signaled during registration.

The UE having a subscription to at least one service associated with a secure edge service connection.

The current location of the UE. In some embodiments, the current location includes an indicator that the UE is on at least one of a corporate campus, a roaming area or other foreign location versus a home country and home network, or within a special geographic boundary (e.g., a rural site or an urban site).

At operation 1506, a PDU establishment procedure between the UE and the SMF begins. The PDU establishment procedure comprises the UE requesting the secure edge service. The UE determines to request the secure edge service based on at least the UE's current location, or an explicit request from an application (e.g., via an API). In some embodiments featuring the explicit request, the application always requests the secure connection service. In other embodiments, the application requests the secure connection service only when the application expects to exchange sensitive application data or for other application-dependent reasons. For example, in some embodiments, the application exposes a control enabling a user to explicitly request the secure edge connection. In yet other embodiments, the UE determines to request the secure edge service based on at least one of: an application identifier (e.g., the application is known to handle sensitive data), or the category of the application (e.g., the application is in the category of medical applications, financial applications, or other categories known to be associated with sensitive data). Some embodiments wherein the UE bases the determination on the application category utilize a standardized traffic category or operator specific traffic category as described in the 3GPP standards (e.g., 3GPP TS 23.501).

At operation 1508, the SMF determines to invoke the secure edge service based on both the request by the UE for the secure edge service and the network policies associated with the SMF. The SMF selects an EASDF that is capable of steering the UE towards a secure edge service site and a secure EAS and additionally provides all the DNS related information to the EASDF that indicates the need for a secure EAS. In some embodiments, the SMF also performs additional actions including but not limited to: making sure the PDU session is isolated from other application traffic; and directing the PDU session to a more secure edge data network than the default edge data network.

At operation 1510, the SMF communicates to the UE a DNS server address. The DNS server address is associated with the selected EASDF. This communication is facilitated using the PCO option during the PDU session establishment process. This completes the PDU session establishment, and the UE has access to a packet data session associated with a secure edge connection. In some embodiments, the SMF optionally determines to establish a secure E2E tunnel between the UE and the UPF, such as an encrypted IPsec tunnel, a Wireguard tunnel, or another form of virtual private networking (VPN). Such embodiments protect the exchange of DNS information.

At operation 1512, the UE sends a DNS request to the EASDF. In some embodiments, based on DNS handling rules, after receiving the DNS request from the UE and before sending a final DNS response back to the UE, the EASDF optionally exchanges information with the SMF. The exchanged information comprises, as a non-exclusive example, an FQDN associated with the DNS request. In such embodiments, the FQDN allows the SMF to update the DNS handling rules in the EASDF.

At operation 1514, the EASDF processes the information that the EASDF has received via the SMF. This received information includes but is not limited to: the UE subscription information from the UDM; the network policies from the PCF; the DNS message handling rules generated by the SMF; and the locally configured information in the EASDF. In some such embodiments, the locally configured information includes, as a non-limiting example, information about EAS servers. Additionally, the EASDF determines, based on the factors discussed elsewhere herein, that the UE requires a secure edge service connection.

At operation 1516, based on this information processing, the EASDF determines a real DNS server. In some embodiments, the EASDF modifies the DNS request of the UE and proceeds to send a new DNS request to the real DNS server based on the DNS request of the UE. In such embodiments, the EASDF then receives a real DNS server response.

At operation 1518, based on the information received by the EASDF, including the real DNS server response, the EASDF determines the secure EAS IP address. The 3GPP standards provide various implementations for this determination; specific embodiments use the implementations suited to specific use cases to select the secure EAS.

At operation 1520, the EASDF creates a DNS response and communicates the DNS response back to the UE. The DNS response directs the UE to establish a secure edge connection to an appropriate (e.g., proximate in at least one of geography or network topography) secure EAS at operation 1522.

In some embodiments, the UE is capable (e.g., via a combination of hardware and software) of establishing or utilizing a secure tunnel for use with a secure edge connection. In some such embodiments, if the secure tunnel is not already established, the SMF establishes the secure tunnel between the UE and UPF, such as an encrypted IPsec tunnel, a Wireguard tunnel, or another form of virtual private networking (VPN).

In other embodiments, the UE is not capable (e.g., via a combination of hardware or software) of establishing or utilizing a secure tunnel for use with a secure edge connection. In some such embodiments, the UE is not configured with at least one of the hardware, the software, or a combination of the hardware or software enabling the UE to establish or utilize a secure tunnel for use with a secure edge connection. As a non-limiting example, some such UEs lack hardware configured to accept and execute instructions for operations from the central processing unit(s) of the UE to establish or utilize a secure edge connection. Such hardware includes, e.g., dedicated encryption hardware configured to accept offloaded tasks from the central processing unit(s) of the UE. In some embodiments, such dedicated encryption hardware is said to provide hardware-accelerated encryption. In particular, certain older UEs, or newer but less featureful UEs lack such hardware accelerated encryption and also lack sufficiently powerful central processing unit(s) to utilize a secure tunnel for use with a secure edge connection at a level of performance practicable for use with a secure edge application server as described herein.

As another non-limiting example, other such UEs lack the software to support establishing a secure tunnel (e.g., these UEs lack the software to utilize IPSec, Wireguard, other VPNs, or similar technologies capable of establishing and utilizing a secure tunnel as described in further detail elsewhere herein). In some such embodiments, the hardware of the UE is capable of enabling the UE to establish or utilize a secure tunnel for use with a secure edge connection, but the software enabling the UE to establish or utilize a secure tunnel for use with a secure edge connection is not available on the UE, leaving the UE unable to utilize the hardware. In some such embodiments, the SMF does at least one of: triggering the establishment of over-the-air encryption in the RAN, or triggering the establishment of a secure tunnel in the network between the RAN and UPFs, if such a secure tunnel feature is available.

Figure 4:
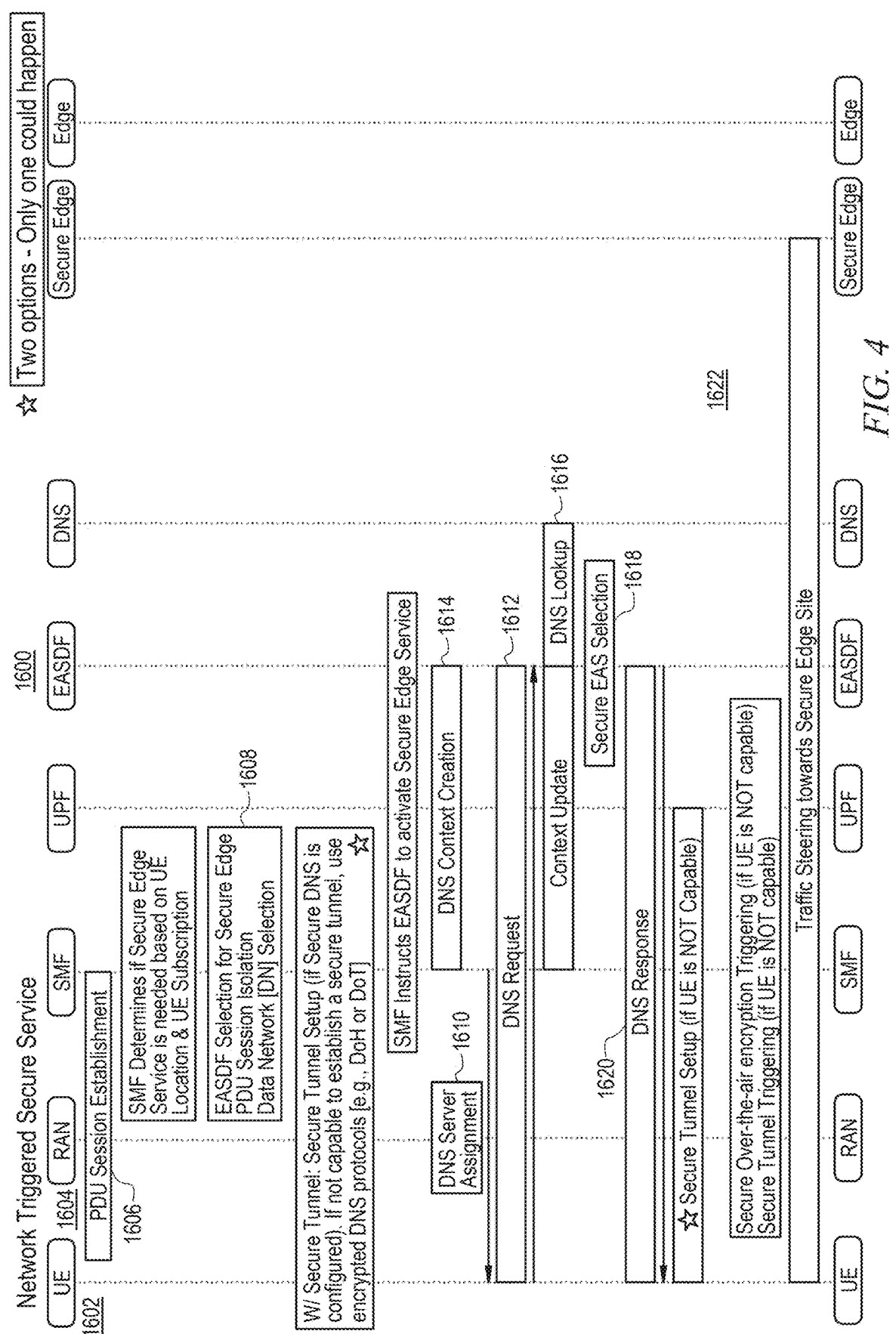
FIG. 4 is a flow diagram of a 3GPP standards-compliant edge application service enhanced to provide a network-triggered end-to-end (E2E) secure application service.

Turning now to FIG. 4, a flow diagram of a 3GPP standards-compliant edge application service 1600 enhanced to provide a network-triggered end-to-end (E2E) secure application service (also called process flow 1600 herein) is described. Except as otherwise defined in this disclosure, acronyms and other terms used to describe the process flow 1600 have at least the meanings provided by the applicable 3GPP standard(s) (e.g., the 3GPP 5G standard(s)). At operation 1602, before a UE registers with a network (e.g., a RAN), the AF uses the standardized "AF influenced on Traffic Routing" (TS 23.501 5.6.7) procedures to provision information and policy rules to turn on a secure edge service for certain UEs when they connect to edge networks. The information and policy rules that extend this standard include but are not limited to indications of when and where to turn on a secure edge service. These information and policy rules include: UE locations, application FQDNs, edge DNNs, S-NSSAIs, at least one flag indicating a need for an isolated PDU session, at least one flag indicating a need for secure E2E tunnels; at least one flag indicating a need for over-the-air encryption in the RAN, and at least one flag indicating a need for a secure tunnel in the network between the RAN and the UPFs. Such information and policies are stored in the UDM.

At operation 1604, the UE registers with the network. The UE subscription information and policies from the UDM and the PCF are loaded into the AMF and the SMF. The subscription information and policies indicate at least the following:

The UE having the capability to connect to a secure edge service, as signaled during registration.

The UE having a subscription to at least one service associated with a secure edge service connection.

The current location of the UE. In some embodiments, the current location includes an indicator that the UE is on at least one of a corporate campus, a roaming area or other foreign location versus a home country and home network, or within a special geographic boundary (e.g., a rural site or an urban site).

In some embodiments, the policies relating to establishing a secure edge service connection are adjusted within the network during this operation.

At operation 1606, a PDU session establishment procedure between the UE and the SMF begins. The PDU session establishment procedure comprises the SMF determining to invoke the secure edge service connection. This determination is based on factors including but not limited to:

The current location of the UE. In some embodiments, the current location includes an indicator that the UE is on at least one of a corporate campus, a roaming area or other foreign location versus a home country and home network, or within a special geographic boundary (e.g., a rural site or an urban site).

All applicable network policies and also the UE having a subscription to secure edge-related services.

At operation 1608, the SMF selects an EASDF that is capable of steering the UE towards a secure edge service site and a secure EAS and additionally provides all the DNS related information to the EASDF that indicates the need for a secure EAS. In some embodiments, the SMF also performs additional actions including but not limited to: making sure the PDU session is isolated from other application traffic; and directing the PDU session to a more secure edge data network than the default edge data network.

At operation 1610, the SMF communicates to the UE a DNS server address. The DNS server address is associated with the selected EASDF. This communication is facilitated using the PCO option during the PDU session establishment process. This completes the PDU session establishment, and the UE has access to a packet data session associated with a secure edge connection. In some embodiments, the SMF optionally determines to establish a secure E2E tunnel between the UE and the UPF, such as an encrypted IPsec tunnel, a Wireguard tunnel, or another form of virtual private networking (VPN). Such embodiments protect the exchange of DNS information.

At operation 1612, the UE sends a DNS request to the EASDF. In some embodiments, based on DNS handling rules, after receiving the DNS request from the UE and before sending a final DNS response back to the UE, the EASDF optionally exchanges information with the SMF. The exchanged information comprises, as a non-exclusive example, an FQDN associated with the DNS request. In such embodiments, the FQDN allows the SMF to update the DNS handling rules in the EASDF.

At operation 1614, the EASDF processes the information that the EASDF has received via the SMF. This received information includes but is not limited to: the UE subscription information from the UDM, the network policies from the PCF, the DNS message handling rules generated by the SMF, and the locally configured information in the EASDF. In some such embodiments, the locally configured information includes, as a non-limiting example, information about EAS servers. Additionally, the EASDF determines, based on the factors discussed elsewhere herein, that the UE requires a secure edge service connection.

At operation 1616, based on this information processing, the EASDF determines a real DNS server. In some embodiments, the EASDF modifies the DNS request of the UE and proceeds to send a new DNS request to the real DNS server based on the DNS request of the UE. In such embodiments, the EASDF then receives a real DNS server response.

At operation 1618, based on the information received by the EASDF, including the real DNS server response, the EASDF determines the secure EAS IP address. The 3GPP standards provide various implementations for this determination; specific embodiments use the implementations suited to specific use cases to select the secure EAS.

At operation 1620, the EASDF creates a DNS response and communicates the DNS response back to the UE. The DNS response directs the UE to establish a secure edge connection to an appropriate (e.g., proximate in at least one of geography or network topography) secure EAS at operation 1622.

In some embodiments, the UE is capable (e.g., via a combination of hardware and software) of utilizing a secure tunnel for use with a secure edge connection. In some such embodiments, if the secure tunnel is not already established, the SMF establishes the secure tunnel between the UE and UPF, such as an encrypted IPsec tunnel, a Wireguard tunnel, or another form of virtual private networking (VPN).

In other embodiments, the UE is not capable of utilizing a secure tunnel for use with a secure edge connection. In some such embodiments, the SMF does at least one of: triggering the establishment of over-the-air encryption in the RAN, or triggering the establishment of a secure tunnel in the network between the RAN and UPFs, if such a secure tunnel feature is available.

Figure 5:
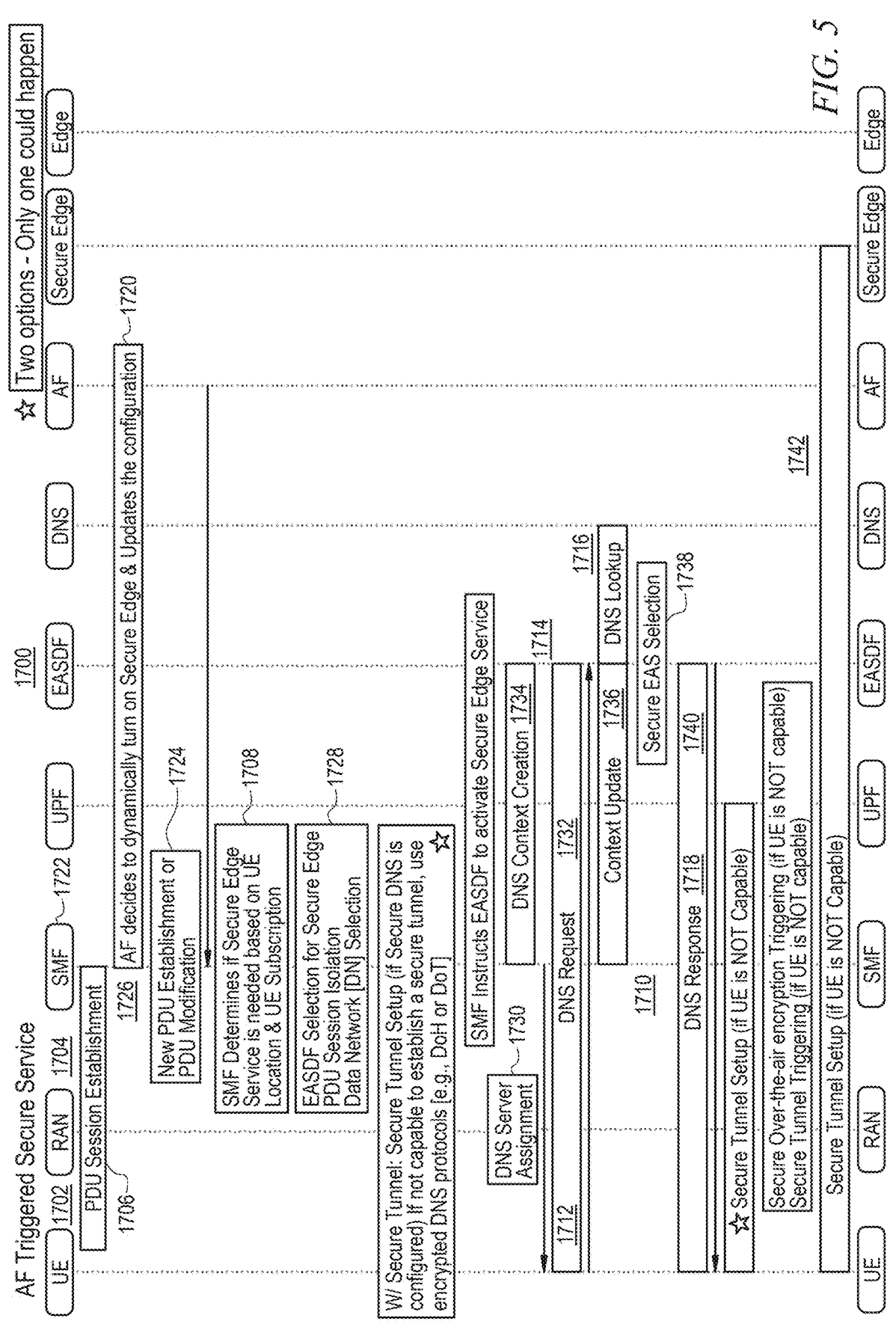
FIG. 5 is a flow diagram of a 3GPP standards-compliant edge application service enhanced to provide an application function-triggered end-to-end (E2E) secure application service.

Turning now to FIG. 5, a flow diagram of a 3GPP standards-compliant edge application service 1700 enhanced to provide an application function-triggered (AF-triggered) end-to-end (E2E) secure application service (also called process flow 1600 herein) is described. In some embodiments, the process flow 1700 extends the process flow 200. Except as otherwise defined in this disclosure, acronyms and other terms used to describe the process flow 1700 have at least the meanings provided by applicable 3GPP standard(s) (e.g., the 3GPP 5G standard(s)).

Operations 1702 through 1718, which establish an unsecured edge service connection, are substantially similar to operations 202 through 218 of process flow 200. Thus, operations 1702 through 1718 are not described in further detail herein.

At operation 1720, at least one of a network (e.g., a RAN) or AF determines to dynamically activate a secure edge service connection based on at least one of the following:

Detection by the AF of a switch to running a new sensitive application in the unsecured edge application server.

Detection by the network of a change in the location of the UE.

The use of sensitive data sets within the unsecured edge application.

At least one of the networks or the unsecured edge application determining to elevate security based on the detection of active security attacks while the unsecured edge service connection is active.

A policy or configuration update within the network.

Some other application-dependent trigger within the AF.

At operation 1722, at least one of the network or AF updates a configuration in the UE subscription and policy rules that are stored in the UDM and pushes these updates to the PCF and SMF via mechanisms defined in the applicable 3GPP standard(s).

At operation 1724, the SMF secures the PDU session by performing at least one of: (1) starting a packet data unit (PDU) session modification procedure; or (2) destroying the PDU session and starting a new PDU session establishment process with the UE.

The remaining operations of the process flow 1700 (operation 1726 through operation 1742) are substantially similar to operations 1606 through 1622 of process flow 1600, as described above herein. As such, these steps will not be described in further detail.

Turning now to FIG. 6, a method 1800 is disclosed. In some embodiments, the method 1800 at least partially implements the process flow 1800. In an embodiment, the method 1800 is a method to trigger, by a radio access network (RAN), a secure edge connection service over the RAN between a known user equipment (UE) associated with a user subscription and a secure edge application server. The method 1800 comprises, at operation 1802 the RAN reads metadata from a centralized network user data store and the known UE. In some embodiments, the metadata comprises at least one of: a capability indicator transmitted from the known UE and configured to indicate the capability of the known UE to use the secure edge connection service, a secure edge service enabled flag based on the user subscription, and a current location of the known UE.

At operation 1804, the RAN enables, based on the metadata, the secure edge connection service for the known UE. At operation 1806, in response to a registration request by the known UE, the RAN registers the known UE with the RAN. In some embodiments, enabling the secure edge connection service further comprises determining at least one of a time to enable the secure edge connection service and a place to enable the secure edge connection service. This determination is based on at least one of: a location of the known UE, an FQDN of the secure EAS, an edge data network name, an S-NSSAI, an isolated PDU session flag, a secure tunnel flag, an over-the-air (OTA) encryption flag, and a wide area network (WAN) secure tunnel flag.

After the registration, the method 1800 further comprises, at operation 1808, the RAN loading subscription information and policies associated with the user subscription of the known UE into a session manager. At operation 1810, the RAN configures, based on the subscription information and policies, a secure edge connection within the RAN.

At operation 1812, the method 1800 begins to establish a PDU session between the known UE and the session manager. In some embodiments, operation 1812 is performed at least in part by the session manager. At operation 1814, the establishment of the PDU session completes by at least: (1) the session manager establishing a secure path between the known UE and a secure edge service site over the configured secure edge connection between the known UE and the RAN; and (2) the session manager informing the known UE of an address associated with a DNS resolver selected by the session manager. In some embodiments, the resolver comprises an edge application server discovery function (EASDF). In some embodiments, the secure edge service site is chosen by the session manager from a list of available secure edge service sites based on a topographical proximity of the known UE to the secure edge service site.

In some embodiments, the secure path comprises a secure tunnel, and the secure tunnel provides an E2E encryption. In some such embodiments, known UE further comprises a secure tunnel module (STM). The STM is configured to establish the secure tunnel between the known UE and the secure EAS. In some other such embodiments, the session manager establishes the secure tunnel between the known UE and the secure EAS, and the secure tunnel comprises an over-the-air (OTA) encryption connection between the RAN and the secure EAS. The selected resolver is configured to steer the known UE over the secure path to the secure edge service site and the secure EAS. The secure edge service site is communicatively coupled to the secure EAS.

At operation 1816, the resolver receives a resolution request from the known UE. In some embodiments, prior to operation 1814, the session manager establishes a second secure path between the known UE and the resolver. The second secure path comprises a second secure tunnel. Such embodiments enable protecting the DNS exchange.

At operation 1818, the resolver responds to the resolution request by sending an IP address to the known UE that directs the known UE over the secure path to the secure edge application server at the secure edge service site. In some embodiments, after the resolver receives a resolution request from the known UE, and before the resolver responds to the resolution request, the resolver and session manager exchange, between the resolver and the session manager, a resolver data update package. The resolver data update package enables the session manager to update a handling rule in the resolver.

Turning now to FIG. 7, a method 1900 is disclosed. In some embodiments, the method 1900 at least partially implements process flow 1700. In an embodiment, the method 1900 is a method to dynamically trigger, by an activator, a secure edge connection over a radio access network (RAN) between a known user equipment (UE) associated with a user subscription and a secure edge application server. The method 1900 comprises, at operation 1902, a session manager establishing an unsecured connection between the known UE and an unsecured edge application server, the unsecured session having a current packet data unit (PDU) session. At operation 1904, the activator detects a security escalation event.

In some embodiments, detecting the security escalation event comprises detecting at least one of the following:

The known UE switching to a sensitive application in the secure edge application server.

A change of location of the known UE.

A sensitive data set being in use.

An attack event targeting the RAN or an application.

At least one of a RAN policy update or a RAN configuration update.

A miscellaneous application-dependent trigger.

At operation 1906, in response to detecting the security escalation event, the activator loads subscription information and policies associated with the user subscription of the known UE into the session manager. At operation 1908, based on the subscription information and policies, the activator configures a secure edge connection within the RAN.

At operation 1910, the activator enhances the current PDU session. The enhancement comprises the current PDU session gaining a secure path between the known UE and a secure edge service site over the configured secure edge connection between the known UE and the RAN. The secure edge service site is communicatively coupled to the secure edge application server. In some embodiments, enhancing the current PDU session further comprises at least one of: (1) modifying the current PDU session and (2) destroying the current PDU session and replacing the current PDU session with a new PDU session.

At operation 1912, the activator completes the enhancement of the current PDU session. Completing the enhancement of the current PDU session comprises at least: the session manager informing the known UE of an address associated with a DNS resolver selected by the session manager, where the selected resolver is configured to steer the UE over the secure path towards the secure edge service site and the secure edge application server; the resolver receiving a resolution request from the known UE, the resolution request included in the security escalation event; and the resolver responding to the resolution request by sending an IP address that directs the UE to the secure edge application server at the secure edge service site.

Completing the enhancement of the current PDU session further includes, at operation 1914, receiving, by the resolver, a resolution request from the known UE, the resolution request included in the security escalation event; and, at operation 1916, responding, by the resolver, to the resolution request by sending an IP address that directs the UE to the secure edge application server at the secure edge service site.

In some embodiments, the activator is at least one of the RAN or an application function (AF) of a requesting application. In some embodiments, the secure path comprises a secure tunnel, and the secure tunnel provides an E2E encryption. In some such embodiments, the session manager establishes the secure tunnel between the known UE and the secure edge application server, and the secure tunnel comprises an over-the-air (OTA) encryption connection between the RAN and the secure EAS.

Figure 8:
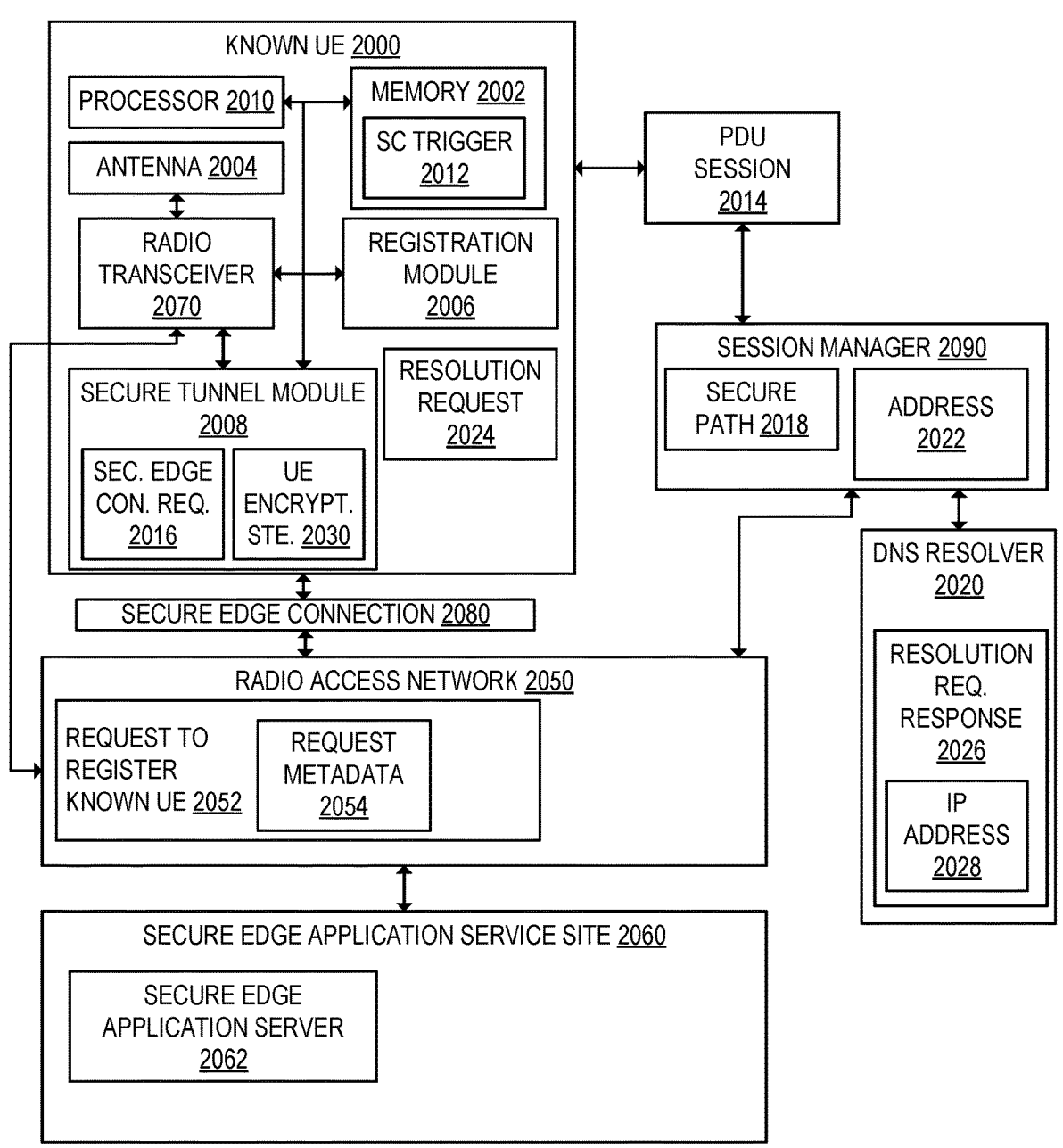
FIG. 8 is a block diagram of a known UE according to an embodiment of the disclosure.

Turning now to FIG. 8, a known user equipment (UE) 2000 is disclosed. In some embodiments, the known UE 2000 at least partially implements process flow 1500. In an embodiment, the known UE 2000 comprises a non-transitory memory 2002 and an antenna 2004. The known UE 2000 further comprises a radio transceiver 2070 coupled to the antenna 2004. The radio transceiver 2070 is communicatively coupled to a radio access network (RAN) 2050.

The known UE 2000 further comprises a registration module 2006 communicatively coupled to the radio transceiver 2002; a secure tunnel module (STM) 2008 communicatively coupled to the radio transceiver 2002; and a processor 2010 coupled to the non-transitory memory 2002, the STM 2008, the registration module 2006, and the radio transceiver 2070. A secure connection trigger module 2012 is stored in the non-transitory memory 2002.

In some embodiments, the STM further comprises a user equipment (UE) encryption suite 2030, the UE encryption suite 2030 comprising at least one of a user equipment (UE) encryption software and a user equipment (UE) encryption hardware. In such embodiments, the UE encryption suite 2030 is configured to maintain a secure path 2018 and the secure path 2018 comprises a secure tunnel. In some embodiments, the secure path 2018 further comprises additional security features imposed by the RAN 2050. Such additional security features include at least one of: isolating a PDU session 2014 from an unrelated application traffic; and directing the PDU session 2014 to use a more secure data network than a default data network. In some other embodiments, a request metadata 2054 comprises a capability indicator configured to indicate the capability of the known UE 2000 to use a secure edge connection service, a secure edge service enabled flag based on the user subscription, and a current location of the known UE.

When the secure connection trigger module 2012 is executed by the processor 2010, the secure connection trigger module 2012 performs operations. These operations comprise sending, using the registration module 2006, a request to register the known UE 2052 over the RAN 2050 to a session manager 2090. The request to register the known UE 2052 comprises the known UE 2000 transmitting over the RAN 2050 the request metadata 2054. Registering the known UE 2000 comprises beginning to establish the PDU session 2014 between the known UE 2000 and the session manager 2090.

The STM 2008 triggers a request for a secure edge connection request 2016 over the RAN 2050 to a secure edge application server 2062. Based on the triggered request for a secure edge connection request 2016, the known UE 2000 receives, from the session manager 2090, over the RAN 2050, a secure path 2018 between the known UE 2000 and a secure edge service site 2060 over a configured secure edge connection 2080 between the known UE 2000 and the RAN 2050. The secure edge service site 2060 is communicatively coupled to the secure edge application server 2062.

At least the STM 2008 completes the establishment of the PDU session 2014. The PDU session 2014 comprises the secure edge connection 2080 from the known UE 2000 to the secure edge service site 2060 over the secure path 2018.

The known UE 2000 receives, from the session manager 2090, an address 2022 associated with a DNS resolver 2020 selected by the session manager 2090. The selected resolver 2020 is configured to steer the known UE 2000 over the secure path 2018 towards the secure edge service site 2060 and the secure edge application server 2062. The known UE 2000 sends, to the resolver 2020, a resolution request 2024. The known UE 2000 receives, from the resolver 2020, a resolution request response 2026. The resolution request response 2026 comprises an IP address 2028 that directs the known UE 2000 over the secure path 2018 to the secure edge application server 2062 at the secure edge service site 2060.

Figure 9:
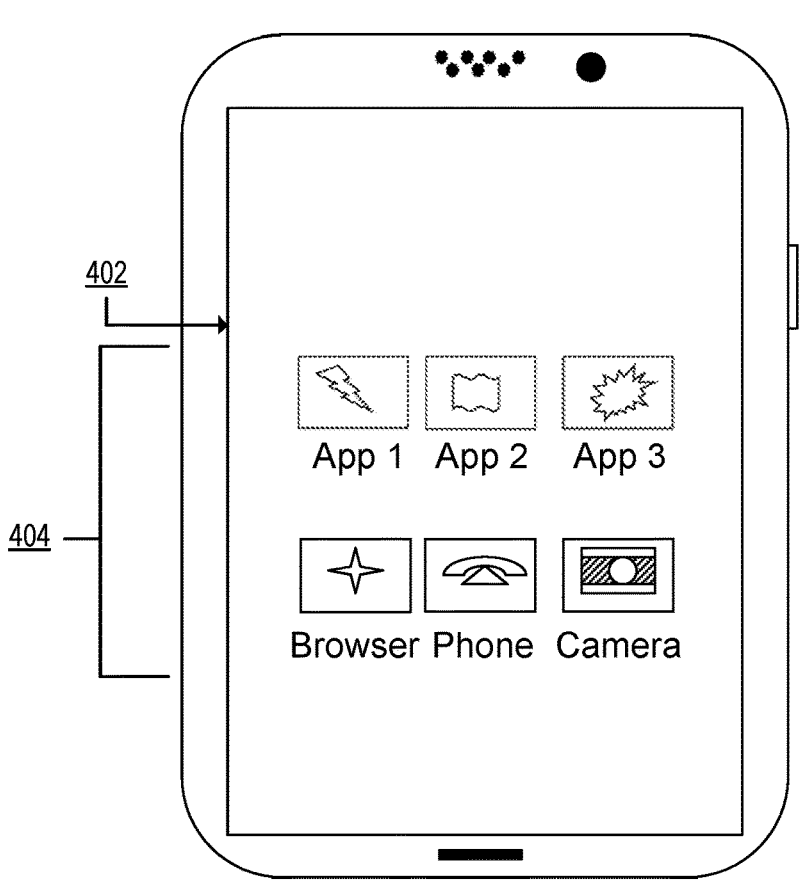
FIG. 9 is an illustration of a UE according to an embodiment of the disclosure.

FIG. 9 depicts the user equipment (UE) 400, which is operable for implementing aspects of the present disclosure, but the present disclosure should not be limited to these implementations. Though illustrated as a mobile phone, the UE 400 may take various forms including a wireless handset, a pager, a personal digital assistant (PDA), a gaming device, or a media player. The UE 400 includes a touchscreen display 402 having a touch-sensitive surface for input by a user. A small number of application icons 404 are illustrated within the touch screen display 402. It is understood that in different embodiments, any number of application icons 404 may be presented in the touch screen display 402. In some embodiments of the UE 400, a user may be able to download and install additional applications on the UE 400, and an icon associated with such downloaded and installed applications may be added to the touch screen display 402 or to an alternative screen. The UE 400 may have other components such as electro-mechanical switches, speakers, camera lenses, microphones, input and/or output connectors, and other components as are well known in the art. The UE 400 may present options for the user to select, controls for the user to actuate, and/or cursors or other indicators for the user to direct. The UE 400 may further accept data entry from the user, including numbers to dial or various parameter values for configuring the operation of the handset. The UE 400 may further execute one or more software or firmware applications in response to user commands. These applications may configure the UE 400 to perform various customized functions in response to user interaction. Additionally, the UE 400 may be programmed and/or configured over-the-air, for example from a wireless base station, a wireless access point, or a peer UE 400. The UE 400 may execute a web browser application which enables the touch screen display 402 to show a web page. The web page may be obtained via wireless communications with a base transceiver station, a wireless network access node, a peer UE 400 or any other wireless communication network or system.

Figure 10:
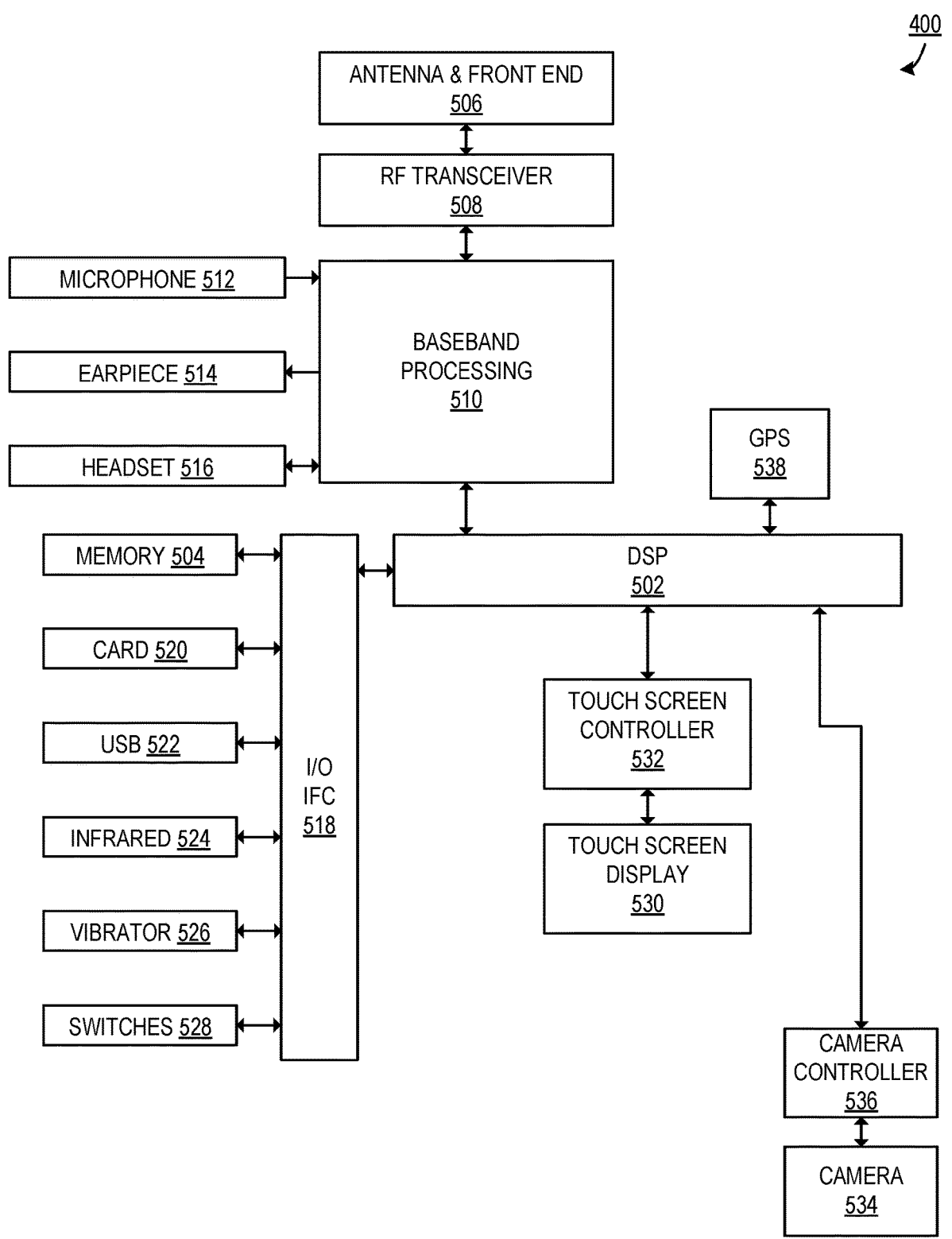
FIG. 10 is a block diagram of a hardware architecture of a UE according to an embodiment of the disclosure.

FIG. 10 shows a block diagram of the UE 400. While a variety of known components of handsets are depicted, in an embodiment a subset of the listed components and/or additional components not listed may be included in the UE 400. The UE 400 includes a digital signal processor (DSP) 502 and a memory 504. As shown, the UE 400 may further include one or more antenna and front end unit 506, a one or more radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, one or more electro-mechanical switches 528, a touch screen display

530, a touch screen controller 532, a camera 534, a camera controller 536, and a global positioning system (GPS) receiver 538. In an embodiment, the UE 400 may include another kind of display that does not provide a touch sensitive screen. In an embodiment, the UE 400 may include both the touch screen display 530 and additional display component that does not provide a touch sensitive screen. In an embodiment, the DSP 502 may communicate directly with the memory 504 without passing through the input/output interface 518. Additionally, in an embodiment, the UE 400 may comprise other peripheral devices that provide other functionality.

The DSP 502 or some other form of controller or central processing unit operates to control the various components of the UE 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the UE 400 to function as a peripheral device to exchange information with a personal computer or other computer system. The infrared port 524 and other optional ports such as a Bluetooth® interface or an IEEE 802.11 compliant wireless interface may enable the UE 400 to communicate wirelessly with other nearby handsets and/or wireless base stations.

In an embodiment, one or more of the radio transceivers is a cellular radio transceiver. A cellular radio transceiver promotes establishing a wireless communication link with a cell site according to one or more of a 5G, a long-term evolution (LTE), a code division multiple access (CDMA), a global system for mobile communications (GSM) wireless communication protocol. In an embodiment, one of the radio transceivers 508 may comprise a near field communication (NFC) transceiver. The NFC transceiver may be used to complete payment transactions with point-of-sale terminals or other communications exchanges. In an embodiment, each of the different radio transceivers 508 may be coupled to its own separate antenna. In an embodiment, the UE 400 may comprise a radio frequency identify (RFID) reader and/or writer device.

The switches 528 may couple to the DSP 502 via the input/output interface 518 to provide one mechanism for the user to provide input to the UE 400. Alternatively, one or more of the switches 528 may be coupled to a motherboard of the UE 400 and/or to components of the UE 400 via a different path (e.g., not via the input/output interface 518), for example coupled to a power control circuit (power button) of the UE 400. The touch screen display 530 is another input mechanism, which further displays text and/or graphics to the user. The touch screen LCD controller 532 couples the DSP 502 to the touch screen display 530. The GPS receiver 538 is coupled to the DSP 502 to decode global positioning system signals, thereby enabling the UE 400 to determine its position.

Figure 11A:
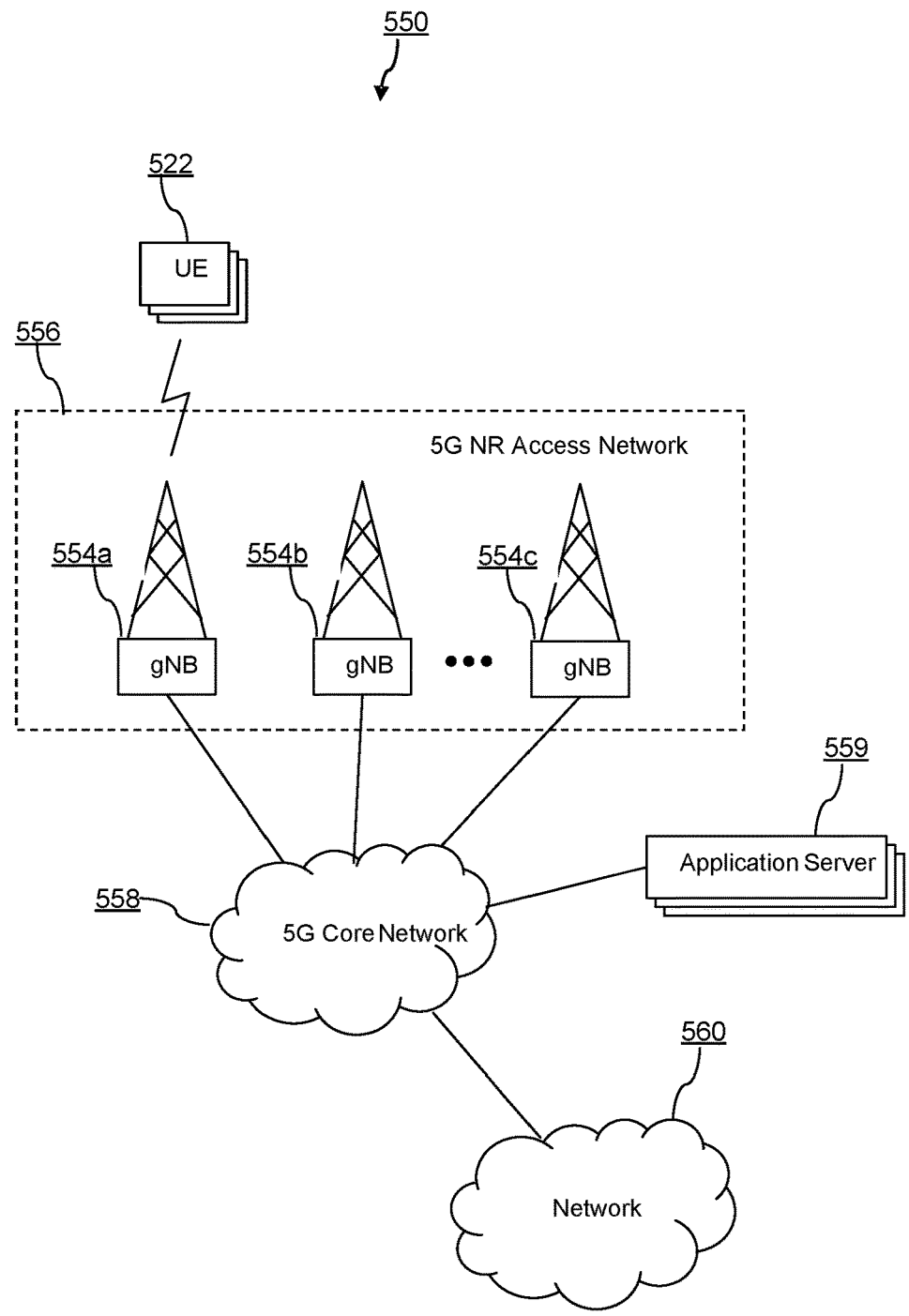
FIG. 11A is a block diagram of an exemplary communication system according to an embodiment of the disclosure.

Turning now to FIG. 11A, an exemplary communication system 550 is described. Typically, the communication system 550 includes a number of access nodes 554 that are configured to provide coverage in which UEs 552 such as cell phones, tablet computers, machine-type-communication devices, tracking devices, embedded wireless modules, and/ or other wirelessly equipped communication devices (whether or not user operated), can operate. The access nodes 554 may be said to establish an access network 556. The access network 556 may be referred to as a radio access network (RAN) in some contexts. In a 5G technology generation an access node 554 may be referred to as a next Generation Node B (gNB). In 4G technology (e.g., long-term evolution (LTE) technology) an access node 554 may be referred to as an evolved Node B (eNB). In 3G technology (e.g., code division multiple access (CDMA) and global system for mobile communication (GSM)) an access node 554 may be referred to as a base transceiver station (BTS) combined with a base station controller (BSC). In some contexts, the access node 554 may be referred to as a cell site or a cell tower. In some implementations, a picocell may provide some of the functionality of an access node 554, albeit with a constrained coverage area. Each of these different embodiments of an access node 554 may be considered to provide roughly similar functions in the different technology generations.

In an embodiment, the access network 556 comprises a first access node 554a, a second access node 554b, and a third access node 554c. It is understood that the access network 556 may include any number of access nodes 554. Further, each access node 554 could be coupled with a core network 558 that provides connectivity with various application servers 559 and/or a network 560. In an embodiment, at least some of the application servers 559 may be located close to the network edge (e.g., geographically close to the UE 552 and the end user) to deliver so-called "edge computing." The network 560 may be one or more private networks, one or more public networks, or a combination thereof. The network 560 may comprise the public switched telephone network (PSTN). The network 560 may comprise the Internet. With this arrangement, a UE 552 within coverage of the access network 556 could engage in air-interface communication with an access node 554 and could thereby communicate via the access node 554 with various application servers and other entities.

The communication system 550 could operate in accordance with a particular radio access technology (RAT), with communications from an access node 554 to UEs 552 defining a downlink or forward link and communications from the UEs 552 to the access node 554 defining an uplink or reverse link. Over the years, the industry has developed various generations of RATs, in a continuous effort to increase available data rate and quality of service for end users. These generations have ranged from "1G," which used simple analog frequency modulation to facilitate basic voice-call service, to "4G"—such as Long-Term Evolution (LTE), which now facilitates mobile broadband service using technologies such as orthogonal frequency division multiplexing (OFDM) and multiple input multiple output (MIMO).

Recently, the industry has been exploring developments in "5G" and particularly "5G NR" (5G New Radio), which may use a scalable OFDM air interface, advanced channel coding, massive MIMO, beamforming, mobile mmWave (e.g., frequency bands above 24 GHz), and/or other features, to support higher data rates and countless applications, such as mission-critical services, enhanced mobile broadband, and massive Internet of Things (IoT). 5G is hoped to provide virtually unlimited bandwidth on demand, for example providing access on demand to as much as 20 gigabits per second (Gbps) downlink data throughput and as much as 10 Gbps uplink data throughput. Due to the increased bandwidth associated with 5G, it is expected that the new networks will serve, in addition to conventional cell phones, general internet service providers for laptops and desktop computers, competing with existing ISPs such as cable internet, and also will make possible new applications in internet of things (IoT) and machine to machine areas.

In accordance with the RAT, each access node 554 could provide service on one or more radio-frequency (RF) carriers, each of which could be frequency division duplex (FDD), with separate frequency channels for downlink and uplink communication, or time division duplex (TDD), with a single frequency channel multiplexed over time between downlink and uplink use. Each such frequency channel could be defined as a specific range of frequency (e.g., in radio-frequency (RF) spectrum) having a bandwidth and a center frequency and thus extending from a low-end frequency to a high-end frequency. Further, on the downlink and uplink channels, the coverage of each access node 554 could define an air interface configured in a specific manner to define physical resources for carrying information wirelessly between the access node 554 and UEs 552.

Without limitation, for instance, the air interface could be divided over time into frames, subframes, and symbol time segments, and over frequency into subcarriers that could be modulated to carry data. The example air interface could thus define an array of time-frequency resource elements each being at a respective symbol time segment and subcarrier, and the subcarrier of each resource element could be modulated to carry data. Further, in each subframe or other transmission time interval (TTI), the resource elements on the downlink and uplink could be grouped to define physical resource blocks (PRBs) that the access node could allocate as needed to carry data between the access node and served UEs 552.

In addition, certain resource elements on the example air interface could be reserved for special purposes. For instance, on the downlink, certain resource elements could be reserved to carry synchronization signals that UEs 552 could detect as an indication of the presence of coverage and to establish frame timing, other resource elements could be reserved to carry a reference signal that UEs 552 could measure in order to determine coverage strength, and still other resource elements could be reserved to carry other control signaling such as PRB-scheduling directives and acknowledgement messaging from the access node 554 to served UEs 552. And on the uplink, certain resource elements could be reserved to carry random access signaling from UEs 552 to the access node 554, and other resource elements could be reserved to carry other control signaling such as PRB-scheduling requests and acknowledgement signaling from UEs 552 to the access node 554.

The access node 554, in some instances, may be split functionally into a radio unit (RU), a distributed unit (DU), and a central unit (CU) where each of the RU, DU, and CU have distinctive roles to play in the access network 556. The RU provides radio functions. The DU provides L1 and L2 real-time scheduling functions; and the CU provides higher L2 and L3 non-real time scheduling. This split supports flexibility in deploying the DU and CU. The CU may be hosted in a regional cloud data center. The DU may be co-located with the RU, or the DU may be hosted in an edge cloud data center.

Figure 11B:
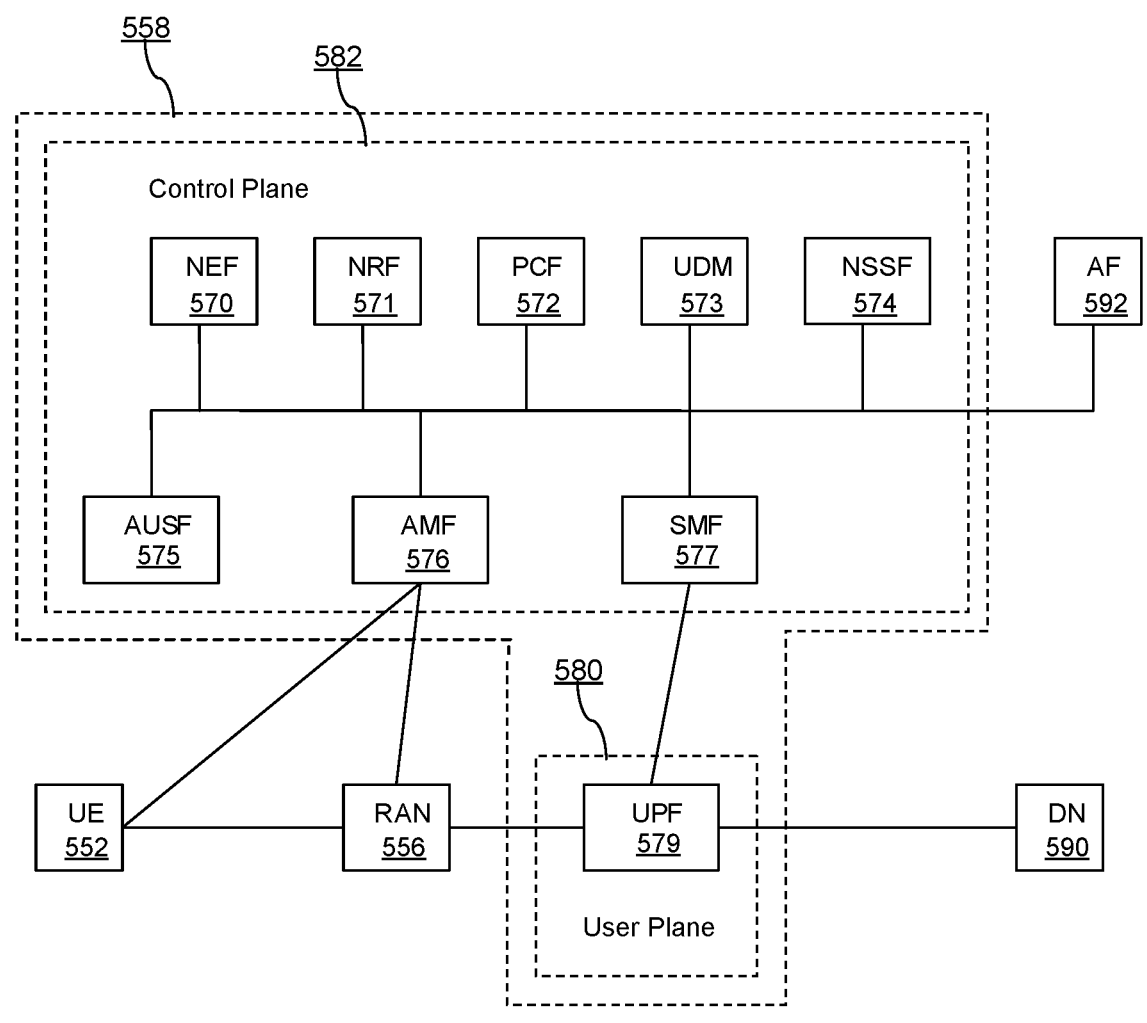
FIG. 11B is a block diagram illustrating further details of the core network described in FIG. 11A according to an embodiment of the disclosure.

Turning now to FIG. 11B, further details of the core network 558 are described. In an embodiment, the core network 558 is a 5G core network. 5G core network technology is based on a service-based architecture paradigm. Rather than constructing the 5G core network as a series of special purpose communication nodes (e.g., an HSS node, an MME node, etc.) running on dedicated server computers, the 5G core network is provided as a set of services or network functions. These services or network functions can be executed on virtual servers in a cloud computing environment which supports dynamic scaling and avoidance of long-term capital expenditures (fees for use may substitute for capital expenditures). These network functions can include, for example, a user plane function (UPF) 579, an authentication server function (AUSF) 575, an access and mobility management function (AMF) 576, a session management function (SMF) 577, a network exposure function (NEF) 570, a network repository function (NRF) 571, a policy control function (PCF) 572, a unified data management (UDM) 573, a network slice selection function (NSSF) 574, and other network functions. The network functions may be referred to as virtual network functions (VNFs) in some contexts.

Network functions may be formed by a combination of small pieces of software called microservices. Some microservices can be re-used in composing different network functions, thereby leveraging the utility of such microservices. Network functions may offer services to other network functions by extending application programming interfaces (APIs) to those other network functions that call their services via the APIs. The 5G core network 558 may be segregated into a user plane 580 and a control plane 582, thereby promoting independent scalability, evolution, and flexible deployment.

The UPF 579 delivers packet processing and links the UE 552, via the access network 556, to a data network 590 (e.g., the network 560 illustrated in FIG. 11A). The AMF 576 handles registration and connection management of non-access stratum (NAS) signaling with the UE 552. Said in other words, the AMF 576 manages UE registration and mobility issues. The AMF 576 manages reachability of the UEs 552 as well as various security issues. The SMF 577 handles session management issues. Specifically, the SMF 577 creates, updates, and removes (destroys) protocol data unit (PDU) sessions and manages the session context within the UPF 579. The SMF 577 decouples other control plane functions from user plane functions by performing dynamic host configuration protocol (DHCP) functions and IP address management functions. The AUSF 575 facilitates security processes.

The NEF 570 securely exposes the services and capabilities provided by network functions. The NRF 571 supports service registration by network functions and discovery of network functions by other network functions. The PCF 572 supports policy control decisions and flow-based charging control. The UDM 573 manages network user data and can be paired with a user data repository (UDR) that stores user data such as customer profile information, customer authentication number, and encryption keys for the information. An application function 592, which may be located outside of the core network 558, exposes the application layer for interacting with the core network 558. In an embodiment, the application function 592 may be execute on an application server 559 located geographically proximate to the UE 552 in an "edge computing" deployment mode. The core network 558 can provide a network slice to a subscriber, for example an enterprise customer, that is composed of a plurality of 5G network functions that are configured to provide customized communication service for that subscriber, for example to provide communication service in accordance with communication policies defined by the customer. The NSSF 574 can help the AMF 576 to select the network slice instance (NSI) for use with the UE 552.

Figure 12A:
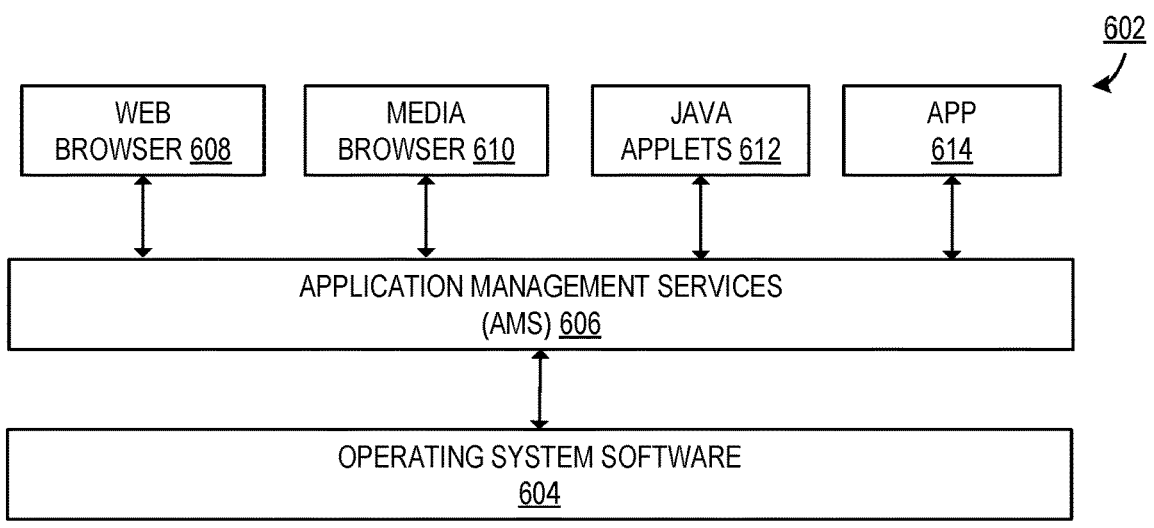
FIG. 12A illustrates a software environment implemented by a DSP according to an embodiment of the disclosure.

FIG. 12A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the UE 400. Also shown in FIG. 12A are a web browser application 608, a media player application 610, and JAVA applets 612. The web browser application 608 may be executed by the UE 400 to browse content and/or the Internet, for example when the UE 400 is coupled to a network via a wireless link. The web browser application 608 may permit a user to enter information into forms and select links to retrieve and view web pages. The media player application 610 may be executed by the UE 400 to play audio or audiovisual media. The JAVA applets 612 may be executed by the UE 400 to provide a variety of functionality including games, utilities, and other functionality.

Figure 12B:
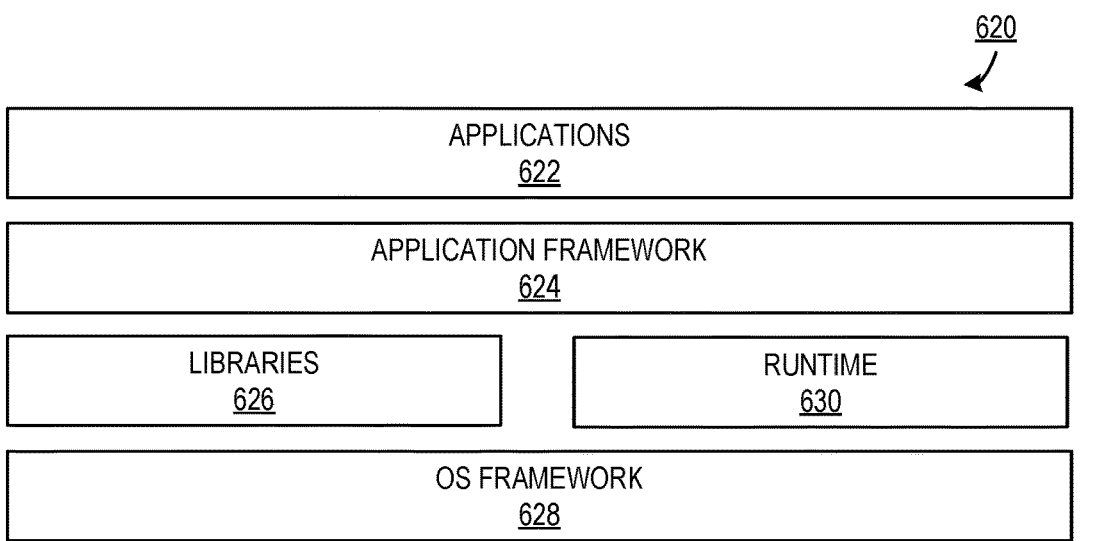
FIG. 12B illustrates an alternative software environment implemented by a DSP according to an embodiment of the disclosure.

FIG. 12B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 13:
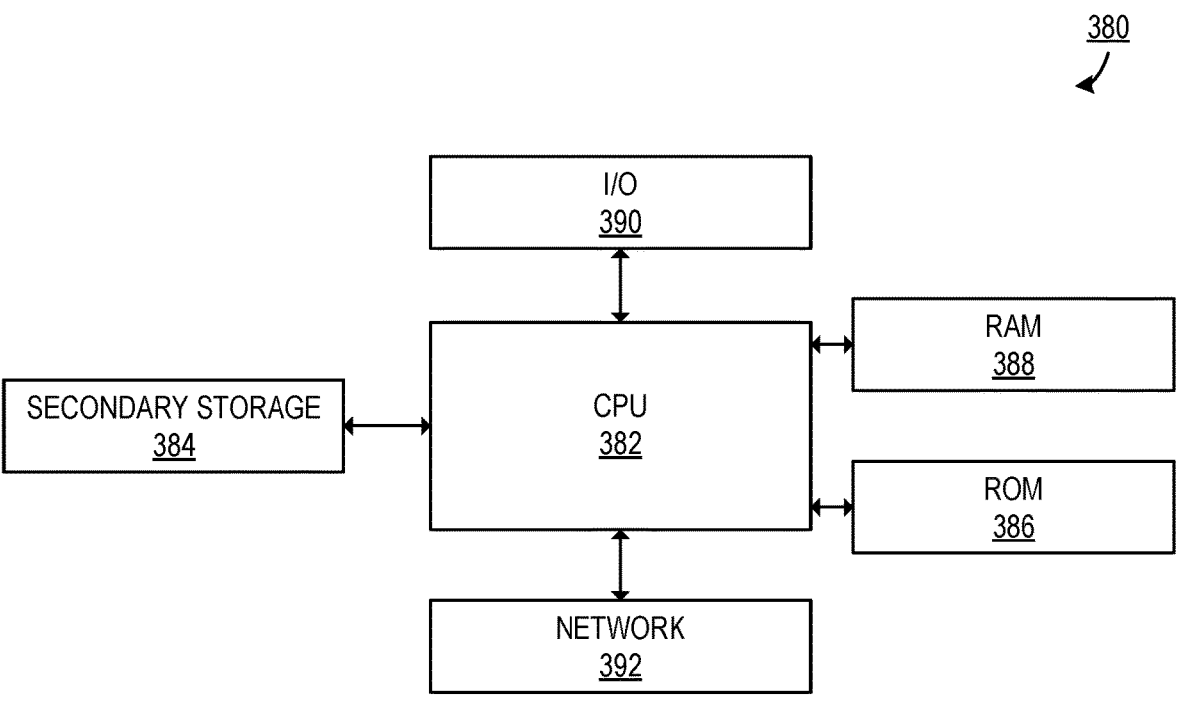
FIG. 13 is a block diagram of a computer system according to an embodiment of the disclosure.

FIG. 13 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk-based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third-party provider. Some cloud computing environments may comprise cloud computing resources owned and operated by the enterprise as well as cloud computing resources hired and/or leased from a third-party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid-state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

Additional Examples

Edge computing is an important aspect of the current 5G wireless communications protocols, including those promulgated as part of the 3GPP standards. Traditional, contemporary 5G edge computing implementations, unlike the present disclosure, have failed to prioritize providing a secure edge communication service implementation. The embodiments described herein thus provide (1) triggers implemented to drive connecting a UE to a network via a secure edge connection; and also (2) recite actions or processes that provide a secure edge connection. Some embodiments of the disclosure implement more than one trigger, or more than one type of trigger. Such triggers include but are not limited to the following.

A UE autonomously determines that the UE needs a secure edge connection based on a determinative indicator. Such determinative indicators include but are not limited to, e.g., a category of a client requesting to attach or connect to a secure edge application server.

An application server that a UE is attempting to connect to determines that the UE needs a secure edge connection.

A network (e.g., a RAN) determines that a UE needs a secure edge connection. In some embodiments, this determination is based on at least one of a subscription service plan attached to the UE; a traffic category indicated in a communication service request; etc. In some such embodiments, the traffic category indicates at least the type of data being transferred (e.g., voice-over-IP; financial transactions; secure messaging; etc.).

An application function (AF) interface of a 5G core network (as defined by the applicable 3GPP standard(s)) determines that a UE should have a secure edge connection. In some embodiments, this trigger behaves similarly to a trigger belonging to an application server, as described above.

The embodiments disclosed herein contemplate more than one approach to implementing a secure edge connection. Some embodiments use only one such approach. Other embodiments combine at least one approach. These approaches include but are not limited to the following.

Providing a secure tunnel from an application server to a UE.

Providing a secure tunnel within a network (e.g., a RAN) that connects the network to an application server. A UE connects to the network and receives access to the secure tunnel (and thus the application server), without any awareness that the secure tunnel exists. This approach enables a secure edge connection even when the UE lacks the capability, either in hardware or software or both, to establish and maintain a secure edge connection directly between the UE and the application server.

Providing a secure tunnel using, at least in part, secure DNS messages. Some such embodiments use the equivalent of secure DNS messages provided by, e.g., various 3GPP standards.

Some embodiments disclosed herein provide a local secure edge data network for delivering locally offloaded secure content and services. In such embodiments, "local" refers to at least one of geographic proximity or proximity defined by network topology. This allows network traffic to be broken out and steered locally to support at least: (1) highly sensitive and secure application traffic or (2) other applications that require non-intermingling traffic or local secure offload. Applications providing financial services particularly benefit from integration with the embodiments disclosed herein.

In addition to and except as in conflict with the foregoing detailed description, some embodiments function based on the 3GPP 5G standards as follows.

Based on information (including as a non-limiting example a current location of a UE), the UE notifies a network that a specific edge application presently to be run is sensitive or otherwise requires heightened security.

Based on data the UE provides to the network, a new secure session is created between the UE and the network.

The UE establishes a PDU session using a secure tunnel (e.g., IPSec signaling SA using NAS session management messages with the SMF via the AMF).

The secure tunnel is used for application traffic transfer between the UE and the data network.

Optionally, the network or edge application uses secure DNS message exchanges and secure DNS procedures to safeguard data integrity and source authentication. In some such examples, the application traffic is offloaded to a local edge data network via a local edge DNS resolver if such security necessary to establish a private route for DNS. The private route accommodates edge application traffic serviced at the edge data network located at the edge.

Embodiments herein are applicable to the field of edge discovery. Edge discovery is concerned with determining, when a UE connects to a network, which edge network and which secure EASes to connect to. In some embodiments, DNS or other metadata is used to select the most performant secure edge or secure EAS (for example, the secure edge or secure EAS having the lowest latency of the available secure edges and secure EASes) based on at least of geographical proximity or topographical proximity. In such embodiments, when a UE receives secure edge service from a suitably proximate secure edge or secure EAS, the UE experiences at least one of reduced latency, lower collective network load, and other performance enhancements associated with replacing a centralized network service with a service situated on a network edge.

Embodiments herein make use of the domain name service (DNS). In some embodiments, the DNS service and related hardware and software features implement secure DNS via, as a non-limiting example, DNS over HTTPS (DoH), which encrypts DNS queries that would otherwise be unencrypted in the base DNS protocol. In some embodiments, the secure DNS intercepts and inspects all DNS queries. Most DNS queries pass through inspection with no action taken, nor with any indication to the UE that inspection took place. Some intercepted DNS queries trigger a diversion of traffic to a secure EAS, as described elsewhere herein. Also, as described elsewhere herein, secure DNS is usable as a complement and additional layer of security to a secure edge service connection between a UE and a secure EAS.

Other embodiments reference secure edge application service sites or the equivalent. In some such embodiments, a secure edge application service site is a hardened data center. In such embodiments, the hardened data center is hardened secure edge application service site (e.g., embodiments of the secure edge application service site 112 or the secure edge application service site 2060).

Embodiments herein utilize at least one protocol configuration option (PCO) as part of PDU session establishment. In some 3GPP standards, the at least one PCO option indicates a DNS server or equivalent. In such standards, the PCO option is thus an alternative to a dynamic host configuration protocol (DHCP) server. In embodiments herein, the PCO option is used to specify the location (e.g., DNS address) of a secure EASDF as disclosed.

Embodiments utilize at least one EASDF as disclosed herein. The EASDF is part of the current 3GPP 5G standards, and some implementations are configured to suitable edge data networks or edge application services based on at least one of geography, server-side applications, which EASDF has lower latency, etc. Embodiments of the disclosure provide EASDF implementations configured to facilitate secure edge application service connections between a secure EAS and a UE. EASDF implementations of the existing 3GPP standards fail to provide such features. Embodiments of the disclosure thus either enhance or replace 3GPP standards-compliant EASDFs with the EASDF implementations configured to facilitate secure edge application service connections.

In some embodiments herein, when a network (e.g., a RAN) detects that the security of a known UE is compromised, a determination by the network that a secure edge connection is needed controls over whatever instructions are received from the compromised known UE. In such cases, the network either delivers a secure edge connection to the compromised known UE or disconnects the compromised known UE from the network to protect the network.

Some embodiments herein contemplate using detected traffic categories to trigger a secure edge connection service. Category-based embodiments help preserve the privacy of a UE user by obfuscating which application on the UE is triggering the secure edge connection service. Categories include but are not limited to voice over IP, video streaming, messaging, and security applications (e.g., VPN applications). In some embodiments, such categories are based on categories standardized by the 3GPP or another standards body. In other embodiments, the categories are based on specific proprietary vendor (e.g., APPLE® or T-MOBILE®) privacy categories. In yet other embodiments, the categories are based on categories defined by a software application vendor.

Some embodiments that trigger the secure edge connection service to establish a secure edge connection as described herein do so based on the location of a known UE. In some such embodiments, the detected location indicates that the known UE is in a hostile location. Some hostile locations are those which tend to be less secure than others (e.g., a hotel network versus a home network). Other hostile locations are deemed hostile because the locations are within the borders of a hostile state actor known to attempt to compromise user equipment.

Embodiments herein disclose at least one edge data network. In some non-limiting embodiments, an edge data network, sometimes called a cloud edge network, includes but is not limited to a network configured for distributed computing that brings computation and data storage as close to the point of request as possible in order to deliver low latency and save bandwidth. In other non-limiting embodiments, an edge data network includes but is not limited to a cloud edge network comprising data architecture that is strategically organized to push at least one of compute and power resources to edge devices present on a network. This process lowers compute capacity requirements on centralized servers by provisioning edge devices to engage in data processing work or optimize distribution of resources. In such embodiments, the centralized servers are thus available for tasks that some end-point devices are not capable of.

Some embodiments herein notify a user when a UE is connected to a secure EAS as described herein. This allows the user to accurately perceive a real increase in edge service security. As this increased perception proliferates, more users will tend to seek out and use secure edge applications services and devices as described, increasing overall edge application service security across communications networks.

Some embodiments utilize a secure edge connection service as described herein for a user to conduct financial transactions (e.g., via a banking application on a UE connected to a banking service on an EAS). In some such embodiments, a first PDU session is established for general internet use. Upon activation of a banking application on a UE, the banking application requests establishment of a second PDU session to a secure EAS associated with the banking application. The second PDU is set up invisibly to the user, and the second PDU isolates all traffic secure edge connection between the UE and the secure EAS from the traffic on the first PDU as described herein.

Some embodiments herein include a session manager. In such embodiments, the session manager is a software artifact executing on a session manager platform. The session manager platform comprises at least one of, alone or in any combination: a general-purpose computer, a special-purpose computer, a processor (e.g., a CPU as discussed elsewhere herein), or any similarly capable device. Some non-limiting implementations of the activator platform include, but are not limited to, alone or in any combination: the computer system 380, the software environment 602, the software environment 620, the communication system 550, or the core network 558 as discussed herein.

Some embodiments herein include an activator. In such embodiments, the activator is a software artifact executing on an activator platform. The activator platform comprises at least one of, alone or in any combination: a general-purpose computer, a special-purpose computer, a processor (e.g., a CPU as discussed elsewhere herein), or any similarly capable device. Some non-limiting implementations of the activator platform include, but are not limited to, alone or in any combination: the computer system 380, the software environment 602, the software environment 620, the communication system 550, or the core network 558 as discussed herein.

Some embodiments herein include at least one cell site (e.g., as a non-limiting example, the plurality of cell sites 106 of FIG. 1). In some such embodiments, the at least one cell site is a next Generation Node B (gNB) cell site as defined by the relevant 3GPP standards and described herein. In some other such embodiments, the at lest one cell site is an evolved Node B (eNB) cell site as defined by the relevant 3GPP standards and described herein. In yet other embodiments having more than one cell site in a collection of cell sites, the collection of cell sites comprises a combination of at least one eNB cell site and at least one gNB cell site.

Embodiments herein refer to a "real DNS server." In such embodiments, a real DNS server is a DNS server that is part of the global canonical Domain Name System network associated with the Internet. Some such real DNS servers are communicatively coupled to at least one root zone DNS nameserver (also referred to as a "root server") as that term is understood by a person having ordinary skill in the art. Some such real DNS servers are communicatively coupled to at least one top level nameserver as that term is understood by a person having ordinary skill in the art. In some embodiments, real DNS servers are authoritative (e.g., for specific domains and sub-domains) as that term is understood by a person having ordinary skill in the art. In some embodiments, a real DNS server provides public DNS services (e.g., including but not limited to Google or Cloudflare's public DNS servers). In some embodiments, a real DNS server is a DNS resolver, or in the alternative, a final DNS nameserver, as those terms are understood by a person having ordinary skill in the art.

The terms domain name system and domain name service, unless otherwise noted, are used interchangeably herein, and have the meaning(s) known to a person having ordinary skill in the art.

In some embodiments, the resolver is a DNS server communicatively coupled to a secure edge network. In some such embodiments, neither an unsecure edge network nor other unsecure network is communicatively coupled to the resolver. In some such embodiments, the DNS server communicatively coupled to the secure edge network substitutes for and performs substantially the equivalent operations as the EASDF.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method to trigger, by a radio access network (RAN), a secure edge connection service over the RAN between a known user equipment (UE) associated with a user subscription and a secure edge application server, comprising:

reading, by the RAN, metadata from a centralized network user data store, the metadata comprising subscription information indicating at least one of: capability of the known UE to connect to the secure edge connection service, a subscription to at least one service associated with the secure edge connection service, or a current location of the known UE;

enabling, by the RAN, based on the metadata, the secure edge connection service for the known UE;

in response to a registration request by the known UE, registering, by the RAN, the known UE with the RAN;

after registration, loading, by the RAN, subscription information and policies associated with the user subscription of the known UE into a session manager;

based on the subscription information and policies, configuring, by the RAN, a secure edge connection within the RAN;

beginning, by the session manager, to establish a packet data unit (PDU) session between the known UE and the session manager;

completing the establishment of the PDU session by at least:

establishing, by the session manager, a secure path between the known UE and a secure edge service site over the configured secure edge connection between the known UE and the RAN, the secure edge service site being communicatively coupled to the secure edge application server, and informing the known UE, by the session manager, of an address associated with a domain name service (DNS) resolver selected by the session manager, the selected DNS resolver configured to steer the known UE over the secure path to the secure edge service site and the secure edge application server;

receiving, by the DNS resolver, a resolution request from the known UE; and responding, by the DNS resolver, to the resolution request by sending an IP address to the known UE that directs the known UE over the secure path to the secure edge application server at the secure edge service site.

2. The method of claim 1, wherein the secure path comprises a secure tunnel, and the secure tunnel provides an end-to-end (E2E) encryption.

3. The method of claim 2, further comprising:

the known UE further comprises a secure tunnel module (STM);

the STM being configured to establish the secure tunnel between the known UE and the secure edge application server.

4. The method of claim 2, further comprising the session manager establishing the secure tunnel between the known UE and the secure edge application server, the secure tunnel comprising an over-the-air (OTA) encryption connection between the RAN and the secure edge application server.

5. The method of claim 1, wherein the capability of the known UE to connect to the secure edge connection service comprises a capability indicator.

6. The method of claim 1, further comprising the secure edge service site being chosen by the session manager from a list of available secure edge service sites based on a topographical proximity of the known UE to the secure edge service site.

7. The method of claim 1, wherein the DNS resolver comprises an edge application server discovery function (EASDF).

8. The method of claim 1, further comprising the session manager establishing a second secure path between the known UE and the DNS resolver, the second secure path comprising a second secure tunnel.

9. The method of claim 1, wherein enabling by the RAN, based on the metadata, the secure edge connection service for the known UE further comprises determining at least one of a time to enable the secure edge connection service and a place to enable the secure edge connection service, based on at least one of:

a location of the known UE;

a fully qualified domain name (FQDN) of the secure edge application server;

an edge data network name (edge DNN);

a slice ID (S-NSSAI);

an isolated PDU session flag;

a secure tunnel flag;

an over-the-air (OTA) encryption flag; and a wide area network (WAN) secure tunnel flag.

10. The method of claim 1, further comprising, after the DNS resolver receives a resolution request from the known UE, and before the DNS resolver responds to the resolution request:

exchanging, between the DNS resolver and the session manager, a DNS resolver update data package;

wherein the DNS resolver update data package enables the session manager to update a handling rule in the DNS resolver.

11. A method to dynamically trigger, by an activator, a secure edge connection over a radio access network (RAN) between a known user equipment (UE) associated with a user subscription and a secure edge application server, comprising:

establishing, by a session manager, an unsecured connection between the known UE and an unsecured edge application server, the unsecured session having a current packet data unit (PDU) session;

detecting, by the activator, a security escalation event, the activator comprising at least one of the RAN or an application function (AF) of a requesting application, the detecting comprising the activator monitoring at least one of: switching to a sensitive application, change of UE location, use of a sensitive data set, an attack event, or a policy update;

in response to detecting the security escalation event, the activator performing operations comprising:

loading subscription information and policies associated with the user subscription of the known UE into the session manager;

based on the subscription information and policies, configuring a secure edge connection within the RAN;

enhancing, by the activator, the current PDU session, the enhancement comprising the current PDU session gaining a secure path between the known UE and a secure edge service site over the configured secure edge connection between the known UE and the RAN, the secure edge service site being communicatively coupled to the secure edge application server;

completing, by the activator, the enhancement of the current PDU session by at least:

informing the known UE, by the session manager, of an address associated with a domain name service (DNS) resolver selected by the session manager, the selected DNS resolver configured to steer the UE over the secure path towards the secure edge service site and the secure edge application server, and receiving, by the DNS resolver, a resolution request from the known UE, the resolution request included in the security escalation event; and responding, by the DNS resolver, to the resolution request by sending an IP address that directs the UE to the secure edge application server at the secure edge service site.

12. The method of claim 11, wherein the secure path comprises a secure tunnel, and the secure tunnel provides an end to end (E2E) encryption.

13. The method of claim 12, further comprising the session manager establishing the secure tunnel between the known UE and the secure edge application server, the secure tunnel comprising an over-the-air (OTA) encryption connection between the RAN and the secure edge application server.

14. The method of claim 11, wherein enhancing the current PDU session further comprises at least one of:
modifying the current PDU session; and
destroying the current PDU session and replacing the current PDU session with a new PDU session.

15. A known user equipment (UE), comprising:
a non-transitory memory;
an antenna;
a radio transceiver coupled to the antenna, the radio transceiver communicatively coupled to a radio access network (RAN);
a registration module communicatively coupled to the radio transceiver;
a secure tunnel module (STM) communicatively coupled to the radio transceiver;
a processor coupled to the non-transitory memory, the STM, the registration module, and the radio transceiver;
a secure connection trigger module stored in the non-transitory memory that, when executed by the processor, performs operations comprising:
sending, using the registration module, a request to register the known UE over the RAN to a session manager,
the request comprising the known UE transmitting over the RAN a request metadata, and
the registering comprising beginning to establish a packet data unit (PDU) session between the known UE and the session manager;
triggering, using the STM, a request for a secure edge connection over the RAN to a secure edge application server;
based on the triggered request, receiving, from the session manager, over the RAN, a secure path between the known UE and a secure edge service site over a configured secure edge connection between the known UE and the RAN, the secure edge service site being communicatively coupled to the secure edge application server;

completing the establishment of the PDU session using at least the STM, the PDU session comprising the secure edge connection from the known UE to the secure edge service site over the secure path;
receiving, from the session manager, an address associated with a domain name service (DNS) resolver selected by the session manager, the selected DNS resolver configured to steer the known UE over the secure path towards the secure edge service site and the secure edge application server;
sending, to the DNS resolver, a resolution request from the known UE; and
receiving, from the DNS resolver, a resolution request response, the resolution request response comprising an IP address that directs the known UE over the secure path to the secure edge application server at the secure edge service site.

16. The known UE of claim 15, wherein the STM further comprises a user equipment (UE) encryption suite, the UE encryption suite comprising at least one of a user equipment (UE) encryption software and a user equipment (UE) encryption hardware; wherein the UE encryption suite is configured to maintain the secure path and the secure path comprises a secure tunnel.

17. The known UE of claim 15, wherein the request metadata comprises:
a capability indicator configured to indicate capability of the known UE to use a secure edge connection service;
a secure edge service enabled flag based on the user subscription; and
a current location of the known UE.

18. The known UE of claim 15, wherein the secure path further comprises additional security features imposed by the RAN, the additional security features including at least one of:
isolating the PDU session from an unrelated application traffic; and
directing the PDU session to use a more secure data network than a default data network.

* * * * *